United States Patent
Sakhnini et al.

(10) Patent No.: US 11,581,938 B2
(45) Date of Patent: Feb. 14, 2023

(54) RADIO LINK MONITORING ACROSS MULTIPLE FREQUENCIES IN WIRELESS COMMUNICATIONS

(71) Applicant: QUALCOMM Incorporated, San Diego, CA (US)

(72) Inventors: Iyab Issam Sakhnini, San Diego, CA (US); Yan Zhou, San Diego, CA (US); Tao Luo, San Diego, CA (US); Jelena Damnjanovic, Del Mar, CA (US); Linhai He, San Diego, CA (US); Wooseok Nam, San Diego, CA (US); Mahmoud Taherzadeh Boroujeni, San Diego, CA (US); Juan Montojo, San Diego, CA (US); Peter Gaal, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/188,762

(22) Filed: Mar. 1, 2021

(65) Prior Publication Data
US 2021/0306059 A1 Sep. 30, 2021

Related U.S. Application Data

(60) Provisional application No. 62/994,719, filed on Mar. 25, 2020.

(51) Int. Cl.
*H04B 7/08* (2006.01)
*H04W 76/19* (2018.01)
(Continued)

(52) U.S. Cl.
CPC ........... *H04B 7/088* (2013.01); *H04L 5/0012* (2013.01); *H04W 24/10* (2013.01);
(Continued)

(58) Field of Classification Search
CPC .... H04B 7/088; H04W 76/19; H04W 72/042; H04W 72/0453; H04W 80/02;
(Continued)

(56) References Cited

U.S. PATENT DOCUMENTS

2002/0091844 A1* 7/2002 Craft ..................... H04L 9/40 719/321
2019/0207662 A1* 7/2019 Zhou ..................... H04L 5/0048
(Continued)

FOREIGN PATENT DOCUMENTS

WO WO-2019097432 A1 5/2019

OTHER PUBLICATIONS

International Search Report and Written Opinion—PCT/US2021/020501—ISA/EPO—dated Jun. 2, 2021.

*Primary Examiner* — Mewale A Ambaye
(74) *Attorney, Agent, or Firm* — Qualcomm Incorporated

(57) ABSTRACT

Methods, systems, and devices for wireless communications are described in which a narrowband device may communicate in a wireless communications network according to frequency hopping techniques. Devices using narrowband communications and frequency hopping techniques may maintain separate radio link monitoring (RLM) processes, beam failure detection (BFD) processes, beam failure recovery (BFR) processes, or combinations thereof, for multiple bandwidth parts (BWPs) or hop regions of a full channel bandwidth. Such separate processes may provide for enhanced estimates of beam failures per BWP or hop region, which may be used to enhance communications reliability.

30 Claims, 19 Drawing Sheets

(51) Int. Cl.
*H04W 24/10* (2009.01)
*H04W 80/02* (2009.01)
*H04W 72/0453* (2023.01)
*H04W 72/04* (2023.01)
*H04L 5/00* (2006.01)

(52) U.S. Cl.
CPC ..... *H04W 72/042* (2013.01); *H04W 72/0453* (2013.01); *H04W 76/19* (2018.02); *H04W 80/02* (2013.01)

(58) Field of Classification Search
CPC ............. H04W 36/0033; H04W 8/005; H04W 36/0083; H04W 72/046; H04L 5/0012
See application file for complete search history.

(56) References Cited

U.S. PATENT DOCUMENTS

| | | | |
|---|---|---|---|
| 2019/0313437 A1* | 10/2019 | Jung | H04W 72/0453 |
| 2019/0357292 A1 | 11/2019 | Cirik et al. | |
| 2019/0364445 A1* | 11/2019 | Kang | H04B 7/0695 |
| 2020/0045745 A1 | 2/2020 | Cirik et al. | |
| 2021/0051500 A1* | 2/2021 | Chae | H04W 72/0406 |
| 2021/0204344 A1* | 7/2021 | Babaei | H04W 36/305 |
| 2021/0251033 A1* | 8/2021 | Kanamarlapudi | H04W 28/0231 |

* cited by examiner

RADIO LINK MONITORING ACROSS MULTIPLE FREQUENCIES IN WIRELESS COMMUNICATIONS

CROSS REFERENCE

The present application for patent claims the benefit of U.S. Provisional Patent Application No. 62/994,719 by SAKHNINI et al., entitled "RADIO LINK MONITORING ACROSS MULTIPLE FREQUENCIES IN WIRELESS COMMUNICATIONS," filed Mar. 25, 2020, assigned to the assignee hereof, and expressly incorporated by reference in its entirety herein.

FIELD OF TECHNOLOGY

The following relates generally to wireless communications and more specifically to radio link monitoring (RLM) across multiple frequencies in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments, a device in a wireless communications system may be referred to a narrowband device, which may use less than a full channel bandwidth for communications as compared to other devices (e.g., widerband devices). For example, a UE that uses a 20 megahertz (MHz) sub-channel for communications of an 80 MHz total channel bandwidth may be a narrowband device. A narrowband device, however, may be more susceptible to interference present in the narrower channel relative to wider-band devices that communicate using the full channel bandwidth in cases when other portions of the full channel bandwidth experience lower interference, for instance.

SUMMARY

The described techniques relate to improved methods, systems, devices, and apparatuses that support RLM across multiple frequencies in wireless communications. Various aspects of the present disclosure enable separate RLM processes, beam failure detection (BFD) processes, or beam failure recovery (BFR) processes for each bandwidth part (BWP) of multiple BWPs that span a full channel bandwidth. A UE and a base station may communicate using multiple BWPs according to a frequency hopping pattern in which different BWPs are used at different time periods during the communications. In some cases, the UE may maintain RLM, BFD, or BFR processes separately for each BWP in the frequency hopping pattern.

In some cases, BWP hops may be configured in which frequency sub-bands for one or more hops span across portions of two different BWPs. In such cases, RLM, BFD, and BFR processes may be performed for a hop region (e.g., a set of frequency sub-bands configured for one or more BWP hops) that corresponds to the different frequency sub-bands used for communications. In some cases, the base station may configure different parameter values associated with each BWP that are signaled to the UE when configuring a hopping pattern or when activating the hopping pattern. Additionally or alternatively the base station may configure different parameter values associated with each hop region that are signaled to the UE when configuring a hopping pattern or when activating the hopping pattern. In some cases, one or more timers associated with a particular BWP may be paused during periods in which the UE is switched away from that BWP. Additionally or alternatively, one or more counters associated with a particular BWP may be paused during periods in which the UE is switched away from that BWP. In other cases, one or more timers may continue to run during periods in which the UE is switched away from that BWP. Additionally or alternatively, one or more counters may continue to run during periods in which the UE is switched away from that BWP. In some cases, a timer associated with a BWP (or in other cases a hop region) may be reset if the associated frequency sub-band is not used for a time period. Additionally or alternatively, a counter associated with a BWP (or in other cases a hop region) may be reset if the associated frequency sub-band is not used for a time period. A UE may send a message to a base station requesting particular BWPs or hop regions in order to avoid BWPs or hop regions with increased beam failure events in the frequency hopping pattern.

A method of wireless communication at a UE is described. The method may include receiving, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof, initiating a RLM procedure based on the set of parameters associated with each BWP, and monitoring the two or more BWPs based on the initiating.

An apparatus for wireless communication at a UE is described. The apparatus may include a processor, memory coupled with the processor, and instructions stored in the memory. The instructions may be executable by the processor to cause the apparatus to receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof, initiate a RLM procedure based on the set of parameters associated with each BWP, and monitor the two or more BWPs based on the initiating.

Another apparatus for wireless communication at a UE is described. The apparatus may include means for receiving, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof, initiating a RLM procedure based on the set of parameters associated with each BWP, and monitoring the two or more BWPs based on the initiating.

A non-transitory computer-readable medium storing code for wireless communication at a UE is described. The code may include instructions executable by a processor to receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof, initiate a RLM procedure based on the set of parameters associated with each BWP, and monitor the two or more BWPs based on the initiating.

In some examples of the method, apparatuses, and non-transitory computer-readable medium described herein, each set of parameters include one or more of a counter threshold value for the associated BWP, a timer threshold value for the associated BWP, one or more reference signals to be monitored for the associated BWP, or any combinations thereof. In some examples of the method, apparatuses, and non-transitory computer-readable medium described herein, the two or more frequencies associated with the two or more successive communications each span a frequency sub-band that corresponds to a hop region, and where one or more hop regions span across one or more BWPs.

Some examples of the method, apparatuses, and non-transitory computer-readable medium described herein may further include operations, features, means, or instructions for selecting a first BWP associated with a first hop region for monitoring for a first hop frequency of the two or more frequencies. In some examples of the method, apparatuses, and non-transitory computer-readable medium described herein, the selecting further may include operations, features, means, or instructions for identifying that a majority of the first BWP overlaps with the first hop region. In some examples of the method, apparatuses, and non-transitory computer-readable medium described herein, the selecting further may include operations, features, means, or instructions for identifying that the first hop region is configured to correspond to the first BWP.

Some examples of the method, apparatuses, and non-transitory computer-readable medium described herein may further include operations, features, means, or instructions for initiating separate monitoring values for one or more parameters associated with the two or more BWPs or hop regions associated with the two or more BWPs. In some examples of the method, apparatuses, and non-transitory computer-readable medium described herein, the one or more parameters include one or more timers that continue running when the UE moves away from the associated BWP or hop region. In some examples of the method, apparatuses, and non-transitory computer-readable medium described herein, the one or more parameters include one or more timers that are paused when the UE moves away from the associated BWP or hop region and resumed when the UE moves back to the associated BWP or hop region.

Some examples of the method, apparatuses, and non-transitory computer-readable medium described herein may further include operations, features, means, or instructions for determining that a configured time period since a communication using a first BWP or hop region has elapsed, and resetting the separate monitoring values associated with the first BWP or hop region.

In some examples of the method, apparatuses, and non-transitory computer-readable medium described herein, each set of parameters includes one or more of a RLM reference signal configuration, a beam failure instance maximum count, a BFD counter, a BFR timer, or any combinations thereof. In some examples of the method, apparatuses, and non-transitory computer-readable medium described herein, one or more parameter thresholds associated with the two or more sets of parameters are received from the base station with the configuration information, or with an indication to activate the frequency hopping pattern.

Some examples of the method, apparatuses, and non-transitory computer-readable medium described herein may further include operations, features, means, or instructions for receiving an indication from the base station that the UE is to either use the separate sets of parameters for independent monitoring of the two or more BWPs, or use a single set of parameters that are maintained across hops of the frequency hopping pattern. In some examples of the method, apparatuses, and non-transitory computer-readable medium described herein, the indication is received in radio resource control signaling, in a downlink control information (DCI) transmission, in a medium access control (MAC) control element (MAC-CE), or any combinations thereof.

In some examples of the method, apparatuses, and non-transitory computer-readable medium described herein, a hop region is associated with the two or more frequencies that spans portions of two BWPs, and where the set of parameters associated with each hop region corresponds to the BWP having a larger frequency portion within the hop region. In some examples of the method, apparatuses, and non-transitory computer-readable medium described herein, a hop region is associated with the two or more frequencies that spans portions of two BWPs, and where the monitoring is performed for the two BWPs. In some examples of the method, apparatuses, and non-transitory computer-readable medium described herein, one or more separate counters or timers associated with the two BWPs are used for determining radio link failure at the UE. In some examples of the method, apparatuses, and non-transitory computer-readable medium described herein, one or more separate counters or timers associated a BWP having a larger frequency portion within the hop region are used for determining radio link failure at the UE. In some examples of the method, apparatuses, and non-transitory computer-readable medium described herein, a hop region is associated with the two or more frequencies that spans portions of two BWPs, and where the configuration information further indicates which of the two BWPs are to be monitored.

Some examples of the method, apparatuses, and non-transitory computer-readable medium described herein may further include operations, features, means, or instructions for determining that a timer associated with a first BWP of the two or more BWPs has expired on a threshold number of occasions within a time period, and transmitting, to the base station, a request to skip the first BWP in the frequency hopping pattern. In some examples of the method, apparatuses, and non-transitory computer-readable medium described herein, the threshold number of occasions is indicated in the configuration information. In some examples of the method, apparatuses, and non-transitory computer-readable medium described herein, the timer is a BFD timer associated with the first BWP that is initiated based on channel conditions associated with the first BWP meeting beam failure criteria, and that expires prior to declaring a beam failure on the first BWP. Some examples of the method, apparatuses, and non-transitory computer-readable medium described herein may further include operations, features, means, or instructions for receiving, from the base station, an indication to skip the first BWP in the frequency hopping pattern, and modifying the frequency hopping pattern to skip the first BWP. In some examples of the method, apparatuses, and non-transitory computer-readable medium described herein, the indication to skip the first BWP in the frequency hopping pattern suspends hopping to the first BWP until a subsequent indication from the base station that indicates to resume hopping to the first BWP, or for a configured period of time.

A method of wireless communication at a base station is described. The method may include establishing a connection with a UE that uses a BWP that spans a portion of a total channel bandwidth available for communications between the UE and the base station, identifying a frequency hopping pattern for communications with the UE in which successive transmissions use different BWPs, transmitting, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof, and communicating with the UE according to the frequency hopping pattern.

An apparatus for wireless communication at a base station is described. The apparatus may include a processor, memory coupled with the processor, and instructions stored in the memory. The instructions may be executable by the processor to cause the apparatus to establish a connection with a UE that uses a BWP that spans a portion of a total channel bandwidth available for communications between the UE and the base station, identify a frequency hopping pattern for communications with the UE in which successive transmissions use different BWPs, transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof, and communicate with the UE according to the frequency hopping pattern.

Another apparatus for wireless communication at a base station is described. The apparatus may include means for establishing a connection with a UE that uses a BWP that spans a portion of a total channel bandwidth available for communications between the UE and the base station, identifying a frequency hopping pattern for communications with the UE in which successive transmissions use different BWPs, transmitting, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof, and communicating with the UE according to the frequency hopping pattern.

A non-transitory computer-readable medium storing code for wireless communication at a base station is described. The code may include instructions executable by a processor to establish a connection with a UE that uses a BWP that spans a portion of a total channel bandwidth available for communications between the UE and the base station, identify a frequency hopping pattern for communications with the UE in which successive transmissions use different BWPs, transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof, and communicate with the UE according to the frequency hopping pattern.

In some examples of the method, apparatuses, and non-transitory computer-readable medium described herein, each set of parameters include one or more of a counter threshold value for the associated BWP, a timer threshold value for the associated BWP, one or more reference signals to be monitored for the associated BWP, or any combinations thereof.

In some examples of the method, apparatuses, and non-transitory computer-readable medium described herein, the two or more frequencies associated with two or more successive communications with the UE each span a frequency sub-band that corresponds to a hop region, and where one or more hop regions span across one or more BWPs. In some examples of the method, apparatuses, and non-transitory computer-readable medium described herein, a first BWP is associated with a first hop region that corresponds to a first hop frequency of the two or more frequencies, and where the configuration information further indicates that the UE is to monitor the first BWP that is associated with the first hop region.

Some examples of the method, apparatuses, and non-transitory computer-readable medium described herein may further include operations, features, means, or instructions for configuring the UE to maintain separate monitoring values for one or more parameters associated with the two or more BWPs or hop regions associated with the two or more BWPs. In some examples of the method, apparatuses, and non-transitory computer-readable medium described herein, the one or more parameters include one or more timers that are to continue running when the UE moves away from the associated BWP or hop region. In some examples of the method, apparatuses, and non-transitory computer-readable medium described herein, the one or more parameters include one or more timers that are to be paused when the UE moves away from the associated BWP or hop region and resumed when the UE moves back to the associated BWP or hop region. In some examples of the method, apparatuses, and non-transitory computer-readable medium described herein, the configuration information further indicates a time period for resetting one or more monitoring values or timers associated with a BWP.

In some examples of the method, apparatuses, and non-transitory computer-readable medium described herein, each set of parameters includes one or more of a RLM reference signal configuration, a beam failure instance maximum count, a BFD counter, a BFR timer, or any combinations thereof. In some examples of the method, apparatuses, and non-transitory computer-readable medium described herein, the configuration information further includes one or more parameter thresholds associated with the two or more sets of parameters.

Some examples of the method, apparatuses, and non-transitory computer-readable medium described herein may further include operations, features, means, or instructions for transmitting an indication to the UE that indicates that the UE is to either use the separate sets of parameters for independent monitoring of the two or more BWPs, or use a single set of parameters that are maintained across hops of the frequency hopping pattern. In some examples of the method, apparatuses, and non-transitory computer-readable medium described herein, the indication is transmitted in radio resource control signaling, in a DCI transmission, in a MAC-CE, or any combinations thereof.

In some examples of the method, apparatuses, and non-transitory computer-readable medium described herein, a hop region is associated with the two or more frequencies that spans portions of two BWPs, and where the set of parameters associated with each hop region corresponds to the BWP having a larger frequency portion within the hop region. In some examples of the method, apparatuses, and non-transitory computer-readable medium described herein, a hop region is associated with the two or more frequencies that spans portions of two BWPs, and where the configuration information further indicates which of the two BWPs are to be monitored by the UE.

Some examples of the method, apparatuses, and non-transitory computer-readable medium described herein may further include operations, features, means, or instructions for receiving, from the UE, a request to skip the first BWP in the frequency hopping pattern, transmitting, responsive to the request, an indication to the UE to skip the first BWP in the frequency hopping pattern, and monitoring for communications from the UE based on a modified frequency hopping pattern that skips the first BWP. In some examples of the method, apparatuses, and non-transitory computer-readable medium described herein, the configuration information further indicates one or more thresholds for the UE to transmit the request. In some examples of the method, apparatuses, and non-transitory computer-readable medium described herein, the indication to skip the first BWP in the frequency hopping pattern suspends hopping to the first BWP until a subsequent indication from the base station that indicates to resume hopping to the first BWP, or for a configured period of time.

DETAILED DESCRIPTION

Figure 1:
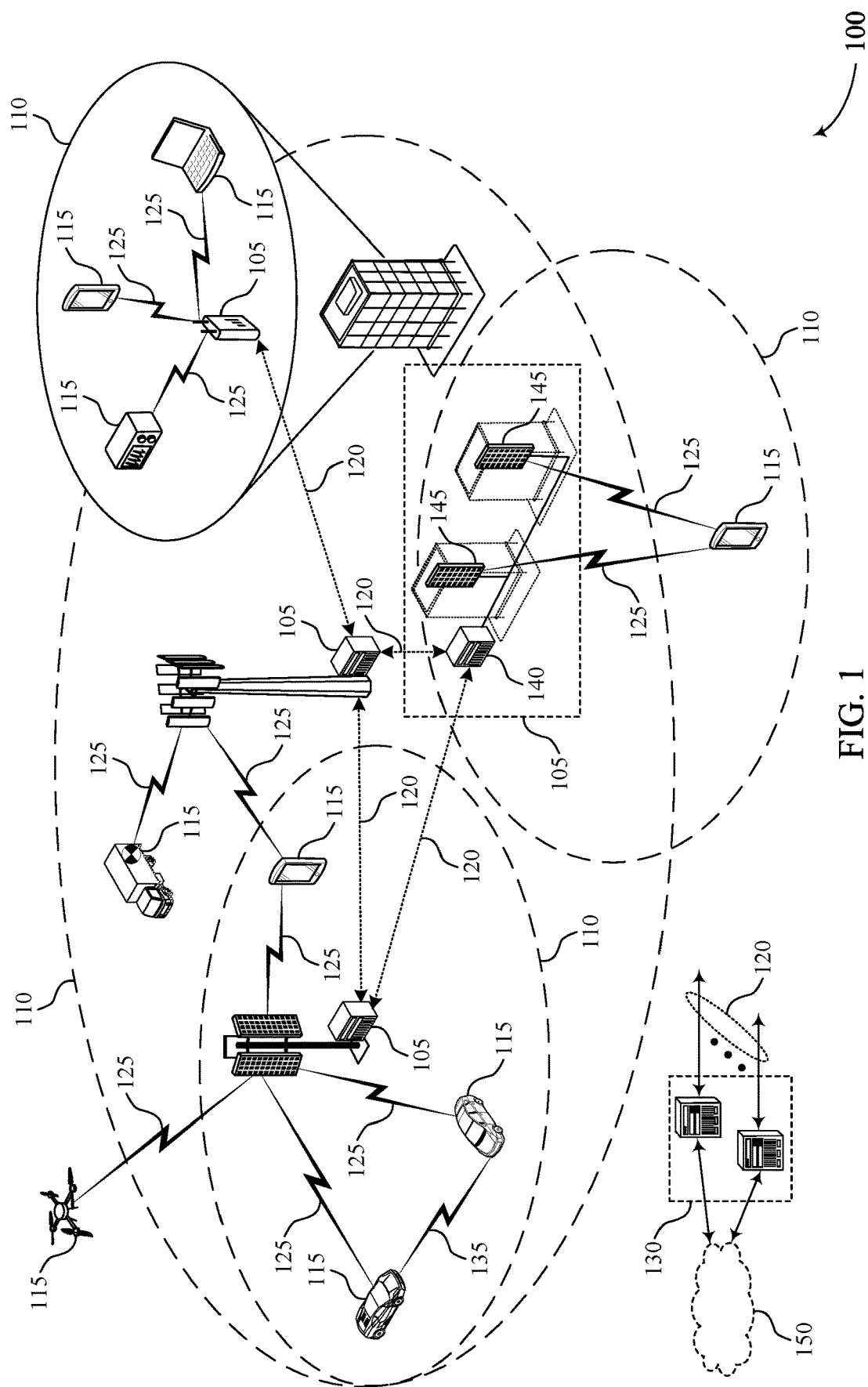
FIG. 1 illustrates an example of a wireless communications system that supports RLM across multiple frequencies in wireless communications in accordance with aspects of the present disclosure.

In some deployments, wireless communications systems may include devices, (e.g., UE devices) that have relatively lower complexity than other devices of the system. For example, some Internet of Things (IoT) devices may periodically communicate in the wireless communications network, and such communications may exchange relatively small amounts of data. Further, such devices may be relatively low-cost devices, and as such, the hardware complexity of such devices may be reduced. In some cases, wireless communications systems may allow for some devices within the system to operate using a reduced frequency bandwidth relative to a full channel bandwidth that may be used by other devices within the system. For example, a narrowband UE may be configured to communicate using one BWP of a full channel bandwidth (e.g., using a 20 MHz BWP of an 80 MHz channel bandwidth). In some cases, in order to provide enhanced frequency diversity of such devices, a frequency hopping pattern may be configured in which transmissions may hop between different BWPs. Such frequency hopping may enhance reliability of such devices by spreading communications across the full channel bandwidth.

In some cases, such a frequency hopping pattern may indicate parameters for a single BWP and may configure the frequency hopping pattern relative to the BWP edges. Here, a UE may move or hop according to the hopping pattern to different BWPs (i.e., based on the parameters indicated for the single BWP and the configured frequency hopping pattern to different BWPs). In other cases, multiple BWPs may each have different configurations that are separately configured. In order to help reduce UE complexity, processes for the BWP may be transparent to the frequency hopping. However, using the same parameters across frequency hops may be inefficient or unsuitable for different processes used by the UE. For example, RLM processes may be used by a UE to identify channel quality characteristics, and if one or more parameters move beyond a threshold value (e.g., a reference signal received power (RSRP), signal-to-noise ratio (SNR), signal to interference and noise ratio (SINR), etc.) the UE may initiate a BFD process, BFR process, or both. If one BWP is experiencing relatively high interference that triggers the initiation of one or more BFD or BFR counters or timers, while other BWPs of the hopping pattern do not experience such interference, the BFD or BFR processes may be inefficient. For example, if the UE hops away from the lower quality BWP for a period, the counters or timers may be reset based on the other BWPs having channel conditions that may work to clear the BFD and BFR counters or timers. The base station and UE may thus lose communications using the lower quality BWP, and a BFR process may not be triggered. Additionally, it may be beneficial to identify the lower quality BWP such that the frequency hopping pattern may be modified to avoid transmissions using such a BWP.

In accordance with various aspects of the present disclosure, when using BWP frequency hopping techniques, separate RLM, BFD, BFR processes, or combinations thereof, may be implemented for each of the multiple BWPs of the full channel bandwidth. In some cases, the UE may maintain RLM, BFD, or BFR processes separately for each BWP in the frequency hopping pattern. In other cases, BWP hops may be configured in which frequency sub-bands of one or more hops span across portions of two different BWPs. For example, RLM, BFD, and BFR processes may be performed for a hop region that corresponds to the different frequency sub-bands used for communications, which may span multiple BWPs. In addition, the base station may configure different parameter values associated with each BWP or hop region. The parameter values may be configured at the UE when configuring the hopping pattern, when activating the hopping pattern, or combinations thereof. In some cases, one or more timers or counters associated with a particular BWP may be paused during periods in which the UE is switched away from that BWP. In other cases, one or more timers or counters may continue to run during periods in which the UE is switched away from that BWP. A timer or counter associated with a BWP or hop region may be reset if the associated frequency sub-band is not used for a time period.

Further, in some cases, a UE may identify one or more BWPs or hop regions that experience increased instances of beam failure events (e.g., RSRP or SINR that drops below a threshold value) relative to other BWPs or hop regions, and may request to avoid hopping to such BWPs or hop regions. In such cases, the base station may modify the hopping pattern to avoid the identified BWP(s) or hop region(s), and signal an indication of the modified hopping pattern to the UE. The modified hopping pattern may be used, in some cases, until the base station signals to switch the hopping pattern again, or for a time period.

Such techniques may provide a number of benefits or advantages. For example, providing different counters or timers per BWP or hop region may provide a better estimate on beam failures per BWP relative to maintaining parameters across different BWPs or hop regions. Such estimates may allow for a base station to account for channel conditions when selecting a hopping pattern, when selecting a modulation and coding scheme for communications, and the like, which may provide for more reliable and efficient communications. Further, in cases where one or more BWPs or hop regions are identified as having less favorable channel conditions, modifying a hopping pattern to avoid such BWPs or hop regions may provide for enhanced reliability.

Aspects of the disclosure are initially described in the context of wireless communications systems. Aspects of the disclosure are further illustrated by and described with reference to apparatus diagrams, system diagrams, and flowcharts that relate to RLM across multiple frequencies in wireless communications.

FIG. 1 illustrates an example of a wireless communications system 100 that supports RLM across multiple frequencies in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 MHz). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to aspects herein, one or more UEs 115 and base stations 105 may communicate using narrowband communications according to frequency hopping techniques. In some cases, separate RLM processes, BFD processes, BFR processes, or combinations thereof, may be implemented at a UE 115 for each of multiple BWPs or hop regions of a full channel bandwidth. Such separate processes may provide for enhanced estimates of beam failures per BWP or hop region, which may be used to enhance communication reliability.

Figure 2:
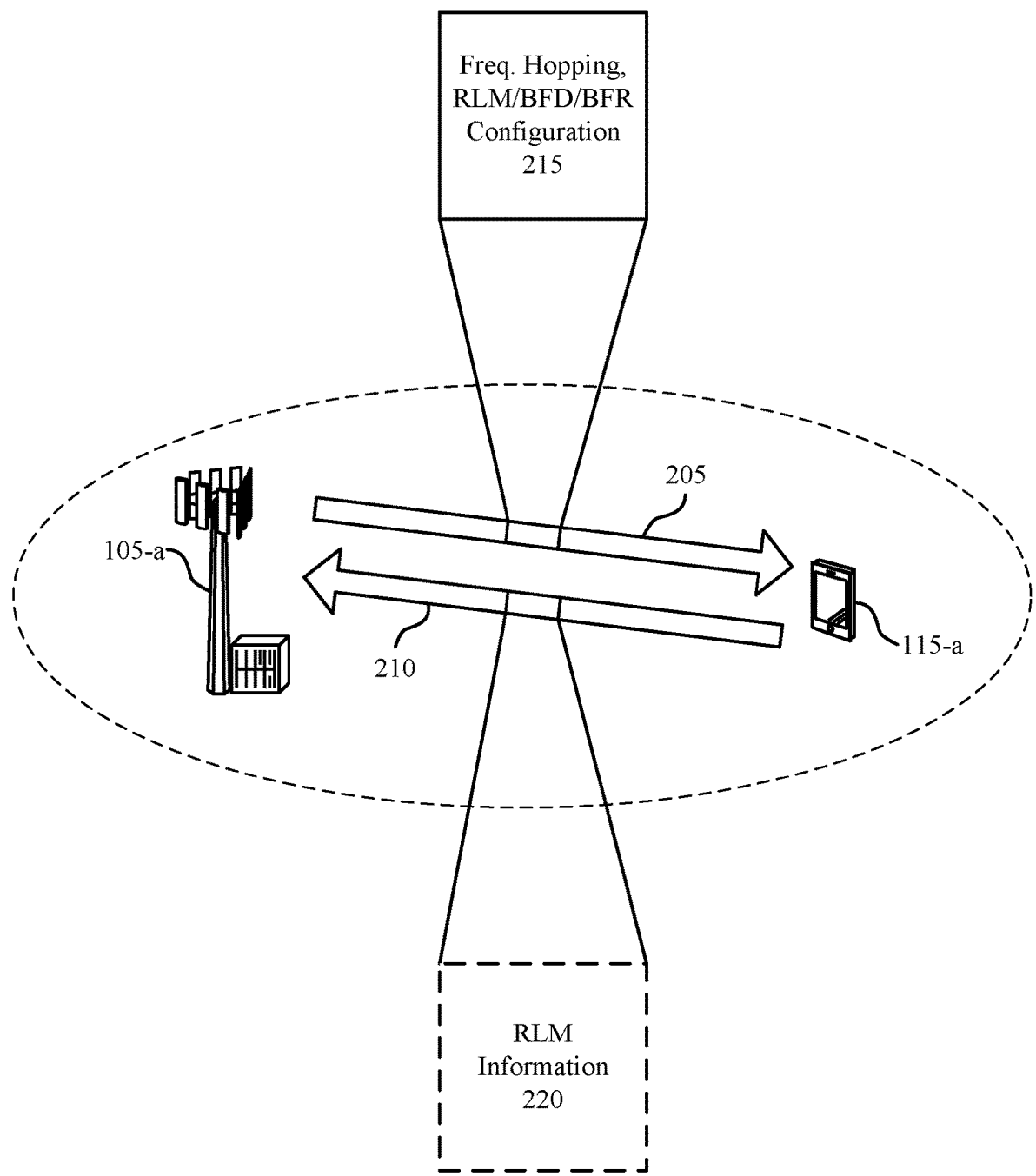
FIG. 2 illustrates an example of a wireless communications system that supports RLM across multiple frequencies in wireless communications in accordance with aspects of the present disclosure.

FIG. 2 illustrates an example of a wireless communications system 200 that supports RLM across multiple frequencies in wireless communications in accordance with aspects of the present disclosure. In some examples, wireless communications system 200 may implement aspects of wireless communications system 100. Wireless communications system 200 may include base station 105-*a* and UE 115-*a*, which may be respective examples of a base station 105 and a UE 115 as described herein.

UE 115-*a* and base station 105-*a* may communicate via downlink carrier 205 and uplink carrier 210. In some cases, carriers 205 and 210 may be the same carrier. In some cases, carriers 205 and 210 may span multiple channels or BWPs for communications (e.g., multiple 20 MHz BWPs). For example, in some cases communications may support wideband operation in which the base station 105-*a* and UE 115-*a* may use multiple BWPs (e.g., an 80 MHz channel may use four 20 MHz BWPs). In other cases, narrowband communications may be supported in which the UE 115-*a* and base station 105-*a* may use fewer BWPs, such as a single BWP (e.g., a single 20 MHz BWP or sub-channel). For example, UE 115-*a* may be a low-complexity device that operates using narrowband communications. As discussed herein, in some cases, the base station 105-*a* may transmit configuration information 215 to the UE 115-*a* to configure frequency hopping, along with RLM, BFD, and BFR parameters in which separate parameters may be provided for each of multiple BWPs that are configured for frequency hopping. In some cases, the multiple BWPs may correspond to BWP hops as discussed with reference to FIG. 3. In other cases, the multiple BWPs may correspond to hop regions as discussed with reference to FIG. 4.

The UE 115-*a* may perform frequency hopping and maintain separate RLM, BFD, and BFR processes for each configured BWP or hop region, based on the configuration information 215. In some cases, the UE 115-*a* may transmit RLM information 220 to the base station 105-*a* based on the configuration information. For example, the UE 115-*a* may identify that one or more BWPs or hop regions is experiencing an increased number of radio link failure (RLF) events that exceeds a threshold value or that has poorer channel quality relative to other BWPs or hop regions, and may transmit a request to the base station 105-*a* to avoid hopping to such BWPs or hop regions.

In some cases, based on the configuration information 215, the UE 115-*a* may configure, for each BWP hop or hop region, one or more counters/timers for RLM, BFD, BFR processes, in which the counters and timers are maintained individually per BWP hop or hop region. In some cases, one or more of the counters or timers for each BWP or hop region may continue running after the UE 115-*a* moves away from the BWP hop. In other cases, one or more of the counters or timers may pause after the UE 115-*a* moves away from the BWP hop, and resumes in the event that the UE 115-*a* returns to the same BWP hop. In some cases, if the UE does not return to the BWP or hop region within a preconfigured time, all counters and timers for that BWP or hop region may be reset.

The configuration information 215 may provide different maximum counters, max times, reference signal sets, or combinations thereof, for each BWP or hop region. For example, the configuration information 215 may include, for each BWP or hop region, different $\bar{q}_0$ and $\bar{q}_1$ sets, different reference signals for RLM (e.g., RadioLinkMonitoringRS), different maximum counts for beam failure instances (e.g., beamFailureInstanceMaxCount), different timer values for declaring RLF after a beam failure instance (e.g., BeamFailureDetectionTimer) or after declaring beam failure (e.g., beamFailureRecoveryTimer), and the like. In some cases, one or more of such parameters may be signaled in the configuration information 215 at the time of the hop configuration, may be signaled to the UE 115-*a* when a hopping configuration is activated, or combinations thereof. Further, in some cases, the base station 105-*a* can signal to the UE (e.g., semi-statically using RRC, or dynamically using DCI or MAC-CE) whether the UE 115-*a* is to use per BWP or hop region parameters (e.g., counters/timers) or a default mode in which RLM, BFD, and BFR parameters are maintained across hops (i.e., separate parameters are not maintained for each BWP or hop region).

Further, in some cases, the UE 115-*a* may detect beam failure instances for a BWP or hop region (e.g., based on a RSRP being below a threshold value, failure to decode a transmission of the BWP hop, etc.). Upon such a detection, the UE 115-*a* may initiate a BFD timer, based on timer value that may be provided with configuration information 215. In the event that one or more beam failure instances are detected prior to the expiration of the BFD timer, the UE 115-*a* may declare a beam failure and initiate a configured BFR process. However, due to the frequency hopping at the UE 115-*a*, the BWP or hop region that experiences the beam failure instance may not be used again for some period of time, and in cases where the timer is not paused when the UE 115-*a* switches away from a BWP, the BFD timer may expire prior to declaration of beam failure for the BWP. In other cases, when the timer is paused after a hop, interference at the BWP may drop such that a subsequent event is not detected again prior to timer expiry, but may be detected again at a subsequent time due to periodic interference at the BWP or hop region.

In some cases, in order to avoid one or more BWPs or hop regions that may be less suitable for communications (e.g., which may occur more commonly in shared radio frequency spectrum), the UE 115-*a* may maintain a count of a number of beam failure incidents that are detected. For example, the UE 115-*a* may maintain a count of a number of BFD timer initiations that have occurred within a prior configured time period (e.g., within a configured time window). In the event that such a count exceeds a threshold value, it may indicate that the BWP or hop region is not suitable for reliable communications, and the UE 115-*a* may transmit a request to the base station 105-*a* to avoid hops to the BWP or hop region. The base station 105-*a* may then ignore or accept the request, and provide an indication of the same to the UE 115-*a*. Based on the indication, the UE 115-*a* and base station 105-*a* may modify the hopping pattern as appropriate. In some cases, when the request is granted, the BWP or hop region is skipped in the hopping pattern until another indication by the base station 105-*a* informs the UE 115-*a* to resume hopping into this BWP or hop region. In other cases, when the request is granted, the BWP or hop region may be skipped for some configured time period after which the initial hopping pattern is resumed and the process repeats in the event of another beam failure incident.

Figure 3:
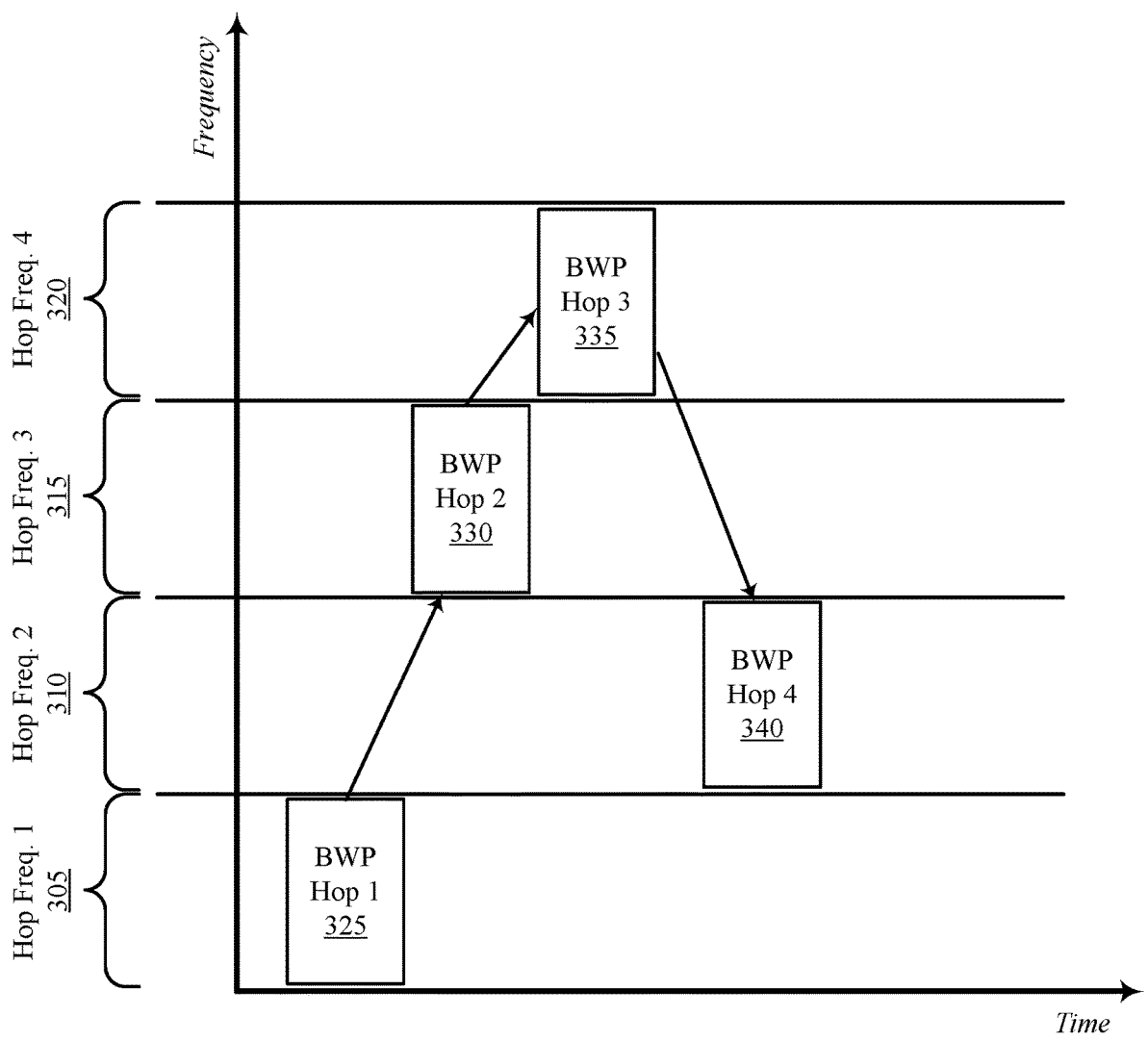
FIG. 3 illustrates an example of narrowband BWPs that support RLM across multiple frequencies in wireless communications in accordance with aspects of the present disclosure.

FIG. 3 illustrates an example of narrowband BWPs 300 that support RLM across multiple frequencies in wireless communications in accordance with aspects of the present disclosure. In some examples, narrowband BWPs 300 may implement aspects of wireless communications system 100 or 200. In this example, a number of hop frequencies may be configured, which include a first hop frequency 305, a second hop frequency 310, a third hop frequency 315, and a fourth hop frequency 320. The hop frequencies 305 through 320 may be used for communications between a UE and a base station (e.g., a UE 115 and a base station 105 of FIG. 1 or 2).

Each hop frequency 305 through 320 may occupy a BWP or sub-band of a total channel bandwidth (e.g., 20 MHz of an 80 MHz channel bandwidth). In this example, a hopping pattern may be configured in which a first BWP hop 325 uses the first hop frequency 305, a second BWP hop 330 uses the third hop frequency 315, a third BWP hop 335 uses the fourth hop frequency 320, and a fourth BWP hop 340 uses the second hop frequency 310. In this example, the UE may maintain separate RLM, BFD, and BFR parameters for the hop frequencies 305 through 320, in accordance with various techniques as discussed herein. While this example shows four hop frequencies 305 through 320, the techniques discussed herein may use any number of different hop frequencies. Further, while 20 MHz BWPs are discussed with reference to a number of examples, different BWP bandwidths may be used that are greater than or less than 20 MHz. Additionally or alternatively, as discussed herein, in some cases hop frequencies may not be precisely aligned within BWPs of a full channel bandwidth. In such cases, multiple hop regions may be defined in accordance with techniques discussed herein, such as illustrated in the example of FIG. 4.

Figure 4:
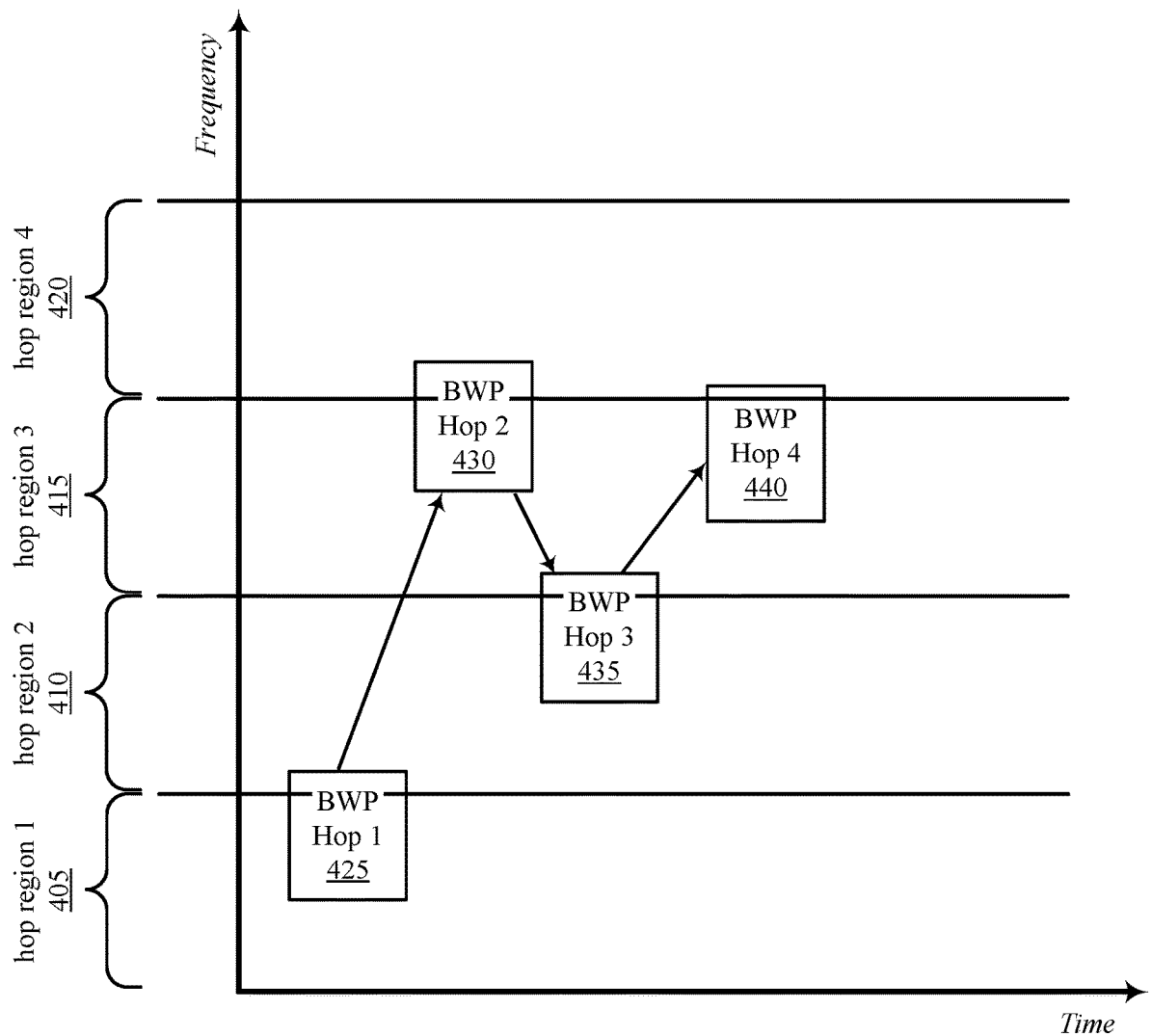
FIG. 4 illustrates an example of narrowband bandwidth regions that support RLM across multiple frequencies in wireless communications in accordance with aspects of the present disclosure.

FIG. 4 illustrates an example of a narrowband bandwidth region 400 that supports RLM across multiple frequencies in wireless communications in accordance with aspects of the present disclosure. In some examples, narrowband bandwidth region 400 may implement aspects of wireless communications system 100 or 200. In this example, a number of BWPs may be configured, similarly as discussed with reference to FIG. 3.

In this example, a hopping pattern may be defined that results in communications using frequency sub-bands that are not centered within a particular BWP, but that may have portions that span across two or more different BWPs. In the example of FIG. 4, a number of hop regions 405 through 420 may be defined, including a first hop region 405, a second hop region 410, a third hop region 415, and a fourth hop region 420. The hopping pattern of this example may provide that a first BWP hop 425 has an associated frequency sub-band, the majority of which overlaps with the first hop region 405. Further, a second BWP hop 430 and a fourth BWP hop 440 may have associated sub-bands that overlap primarily with the third hop region 415, and a third BWP hop 435 may have an associated sub-band that primarily overlaps with the second hop region 410. Thus, a hop region may be associated with frequencies that span portions of two BWPs In this example, the UE may maintain separate RLM, BFD, and BFR parameters for the hop regions 405 through 420, in accordance with various techniques as discussed herein. Such techniques may allow for relatively fine BWP hop frequency hopping shifts, in which an exact same BWP location may not be used for a relatively long time. Such techniques may allow for further frequency diversity by using additional sub-bands within the total channel bandwidth. By providing a number of different hop regions 405 through 420, RLM, BFD, and BFR parameters may be associated with different hop regions, and may be maintained separately at a UE. In some cases, hop regions 405 through 420 may be configured at the UE by a base station. In such cases, RLM/BFD reference signals and counters/timers may be configured per hop region, and a BWP hop may overlap two hop regions. In some cases, RLM/BFD reference signals in the hop region with more overlapped area for a hop shall be measured and used for RLM, BFD, and BFR processes. In other cases, RLM/BFD reference signals from both hop regions that are overlapped by a hop may be measured, and both counters/timers in both hop regions may be used for RLM, BFD, and BFR processes, or only the counters/timers in the hop region with more overlapped area may be used. In other cases, RLM/BFD reference signals of a hop region to be measured are provided to the UE in configuration information for each hop (e.g., in configuration information from the base station).

Figure 5:
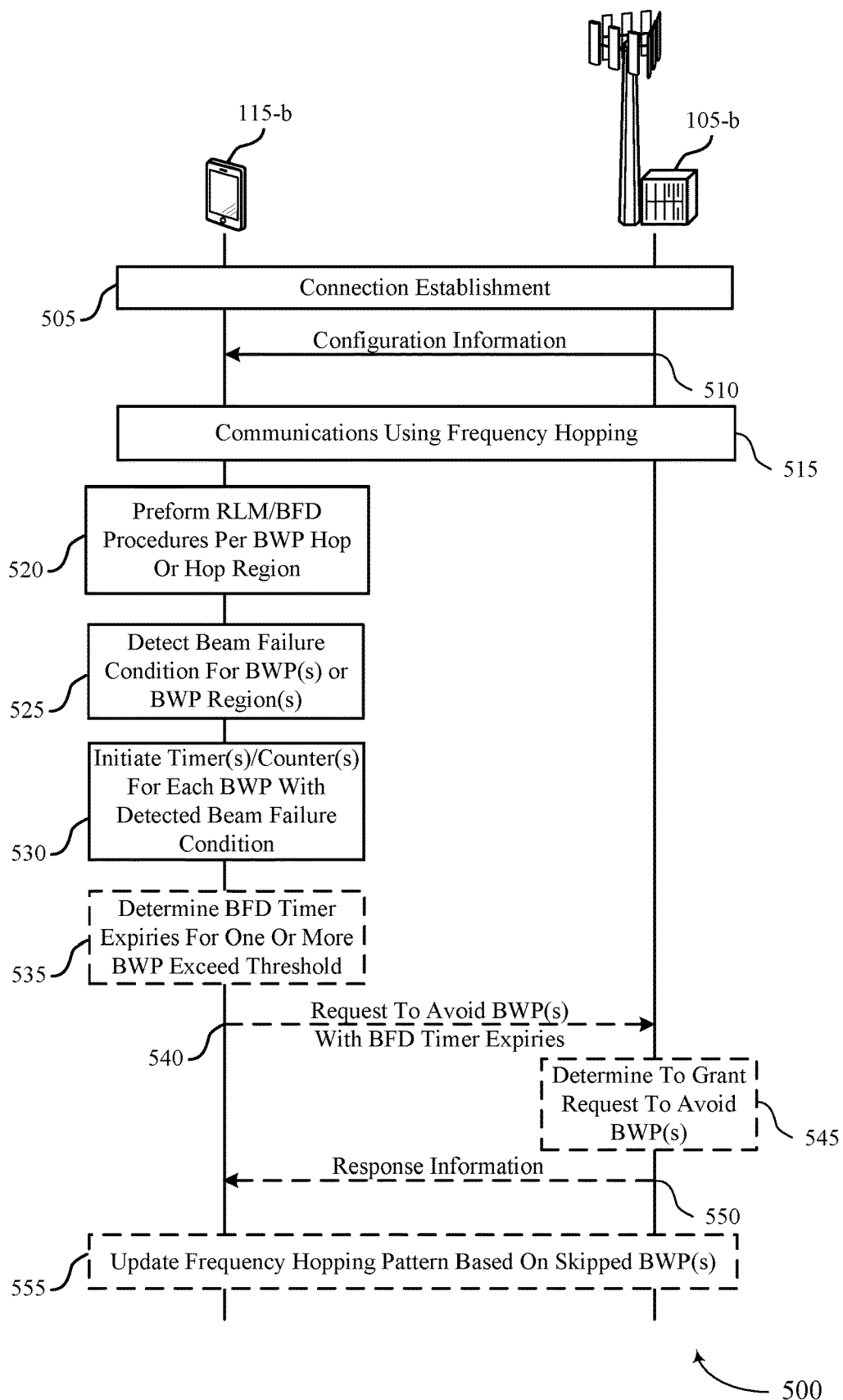
FIG. 5 illustrates an example of a process flow that supports RLM across multiple frequencies in wireless communications in accordance with aspects of the present disclosure.

FIG. 5 illustrates an example of a process flow 500 that supports RLM across multiple frequencies in wireless communications in accordance with aspects of the present disclosure. In some examples, process flow 500 may implement aspects of wireless communications system 100 or 200. Process flow 500 may be implemented by UE 115-*b* and base station 105-*b*, as described herein. Alternative examples of the following may be implemented, where some steps are performed in a different order than described or are not performed at all. In some cases, steps may include additional features not mentioned below, or further steps may be added.

At 505, the base station 105-*b* and UE 115-*b* may perform a connection establishment procedure (e.g., an RRC connection establishment or reestablishment procedure) in which communications between the base station 105-*b* and UE 115-*b* may be established. In some cases, the UE 115-*b* may be a narrowband device that may use a portion of a total channel bandwidth available for wireless communications with the base station 105-*b*.

At 510, the base station 105-*b* may transmit configuration information to the UE 115-*b*. The configuration information may include frequency hopping information that identifies multiple BWPs or hop regions, and a frequency hopping pattern that is to be followed for communications between the UE 115-*b* and the base station 105-*b*. At 515, the UE 115-*b* and the base station 105-*b* may communicate using frequency hopping, according to the frequency hopping pattern provided with the configuration information.

At 520, in accordance with techniques as discussed herein, the UE 115-*b* may perform one or more RLM, BFD, and BFR processes per BWP hop or hop region. In some cases, one or more configuration parameters for the RLM, BFD, and BFR processes may be provided with configuration information, may be provided with an indication to initiate frequency hopping, or any combination thereof.

At 525, the UE 115-*b* may detect a beam failure condition for one of the BWPs or hop regions. In some cases, the beam failure condition may be detected based on measurements of one or more reference signals. At 530, the UE 115-*b* may initiate one or more timers or counters for each BWP or hop region that detected the failure condition. In some cases, if one or more conditions are detected that correspond to a beam failure declaration, the UE 115-*b* may declare a beam failure for a BWP or hop region and initiate a BFR procedure for the BWP or hop region.

In some cases, the one or more timers or counters that were initiated by the UE 115-*b* may expire prior to declaring a beam failure. In such cases, the UE 115-*b* may continue with operations at 515 through 530 in accordance with a configured hopping pattern used for continued communications with the base station 105-*b*.

Optionally, at 535, the UE 115-*a* may determine that a BFD timer has expired for one or more BWPs or hop regions greater than a threshold number of times. For example, the UE 115-*a* may detect a beam failure condition for a first BWP and start the BFD timer, which may subsequently expire prior to the UE 115-*b* declaring a radio link failure. If such a series of events occurs multiple times during a configured time period (e.g., a time window that may be configured in the configuration information from the base station 105-*b*), it may indicate that the first BWP is more prone to interference, and may not be suitable for communications. In such cases, at 540, the UE 115-*b* may transmit a request to avoid one or more BWPs or hop regions that have such a condition. At 545, the base station 105-*b* may determine to grant the request to avoid the identified one or more BWPs or hop regions, and at 550 may transmit response information to the UE 115-*b*. In such cases, the base station 105-*b* and UE 115-*b*, at 555, may determine a modified hopping pattern (e.g., a hopping pattern that skips the first BWP, or a new hopping pattern that is provided with the response information). As discussed herein, the new hopping pattern may be used until the base station 105-*b* provides an indication to switch hopping patterns again, or for a period of time (e.g., that is preconfigured, provided with the configuration information, or provided with the response information).

Figure 6:
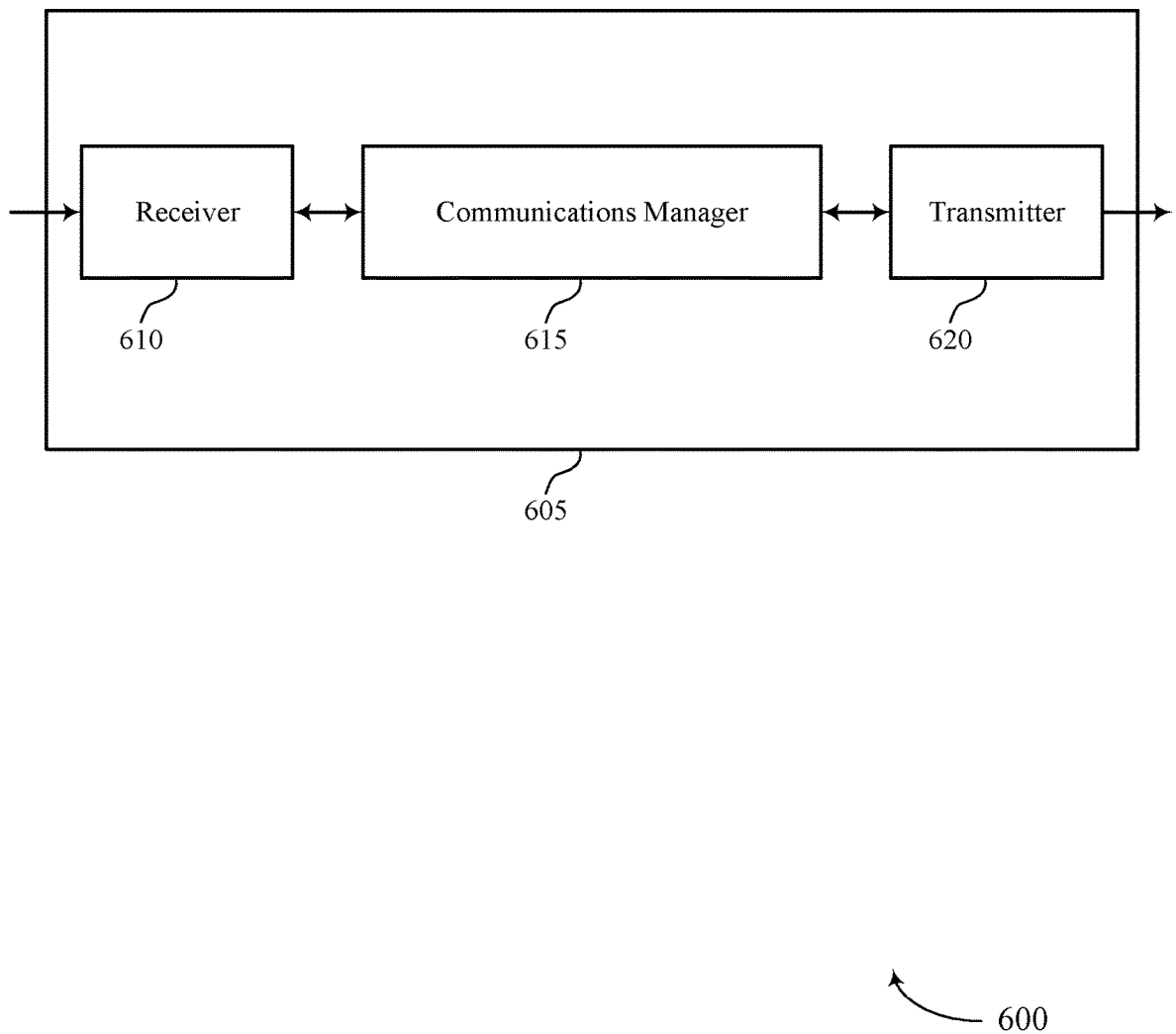
FIGS. 6 and 7 show diagrams of devices that support RLM across multiple frequencies in wireless communications in accordance with aspects of the present disclosure.

FIG. 6 shows a diagram 600 of a device 605 that supports RLM across multiple frequencies in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to RLM across multiple frequencies in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof, initiate a RLM procedure based on the set of parameters associated with each BWP, and monitor the two or more BWPs based on the initiating. The communications manager 615 may be an example of aspects of the communications manager 910 described herein.

The communications manager 615 may as described herein be implemented to realize one or more potential advantages. One implementation may allow the device 605 to perform RLM, BFD, and BFR processes separately for different configured BWPs or hop regions, which may provide an enhanced estimate for beam failures for hopping frequencies configured as part of a hopping pattern. Further, implementations may allow the device 605 to enhance reliability of communications, increase throughput, and enhance user experience, while reducing power consumption associated with retransmissions, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
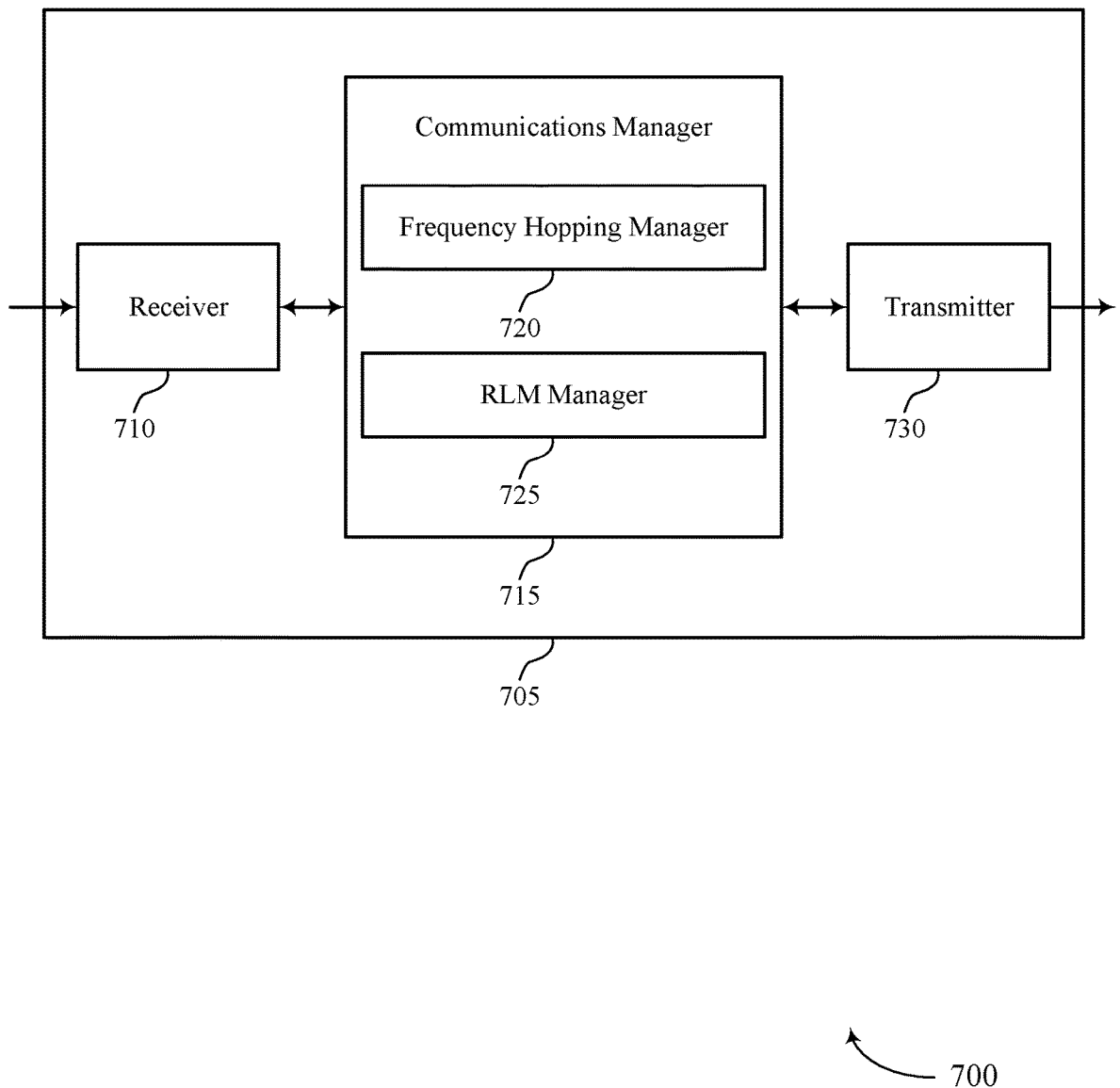

FIG. 7 shows a diagram 700 of a device 705 that supports RLM across multiple frequencies in wireless communications in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to RLM across multiple frequencies in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a frequency hopping manager 720 and a RLM manager 725. The communications manager 715 may be an example of aspects of the communications manager 910 described herein.

The frequency hopping manager 720 may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof.

The RLM manager 725 may initiate a RLM procedure based on the set of parameters associated with each BWP and monitor the two or more BWPs based on the initiating.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
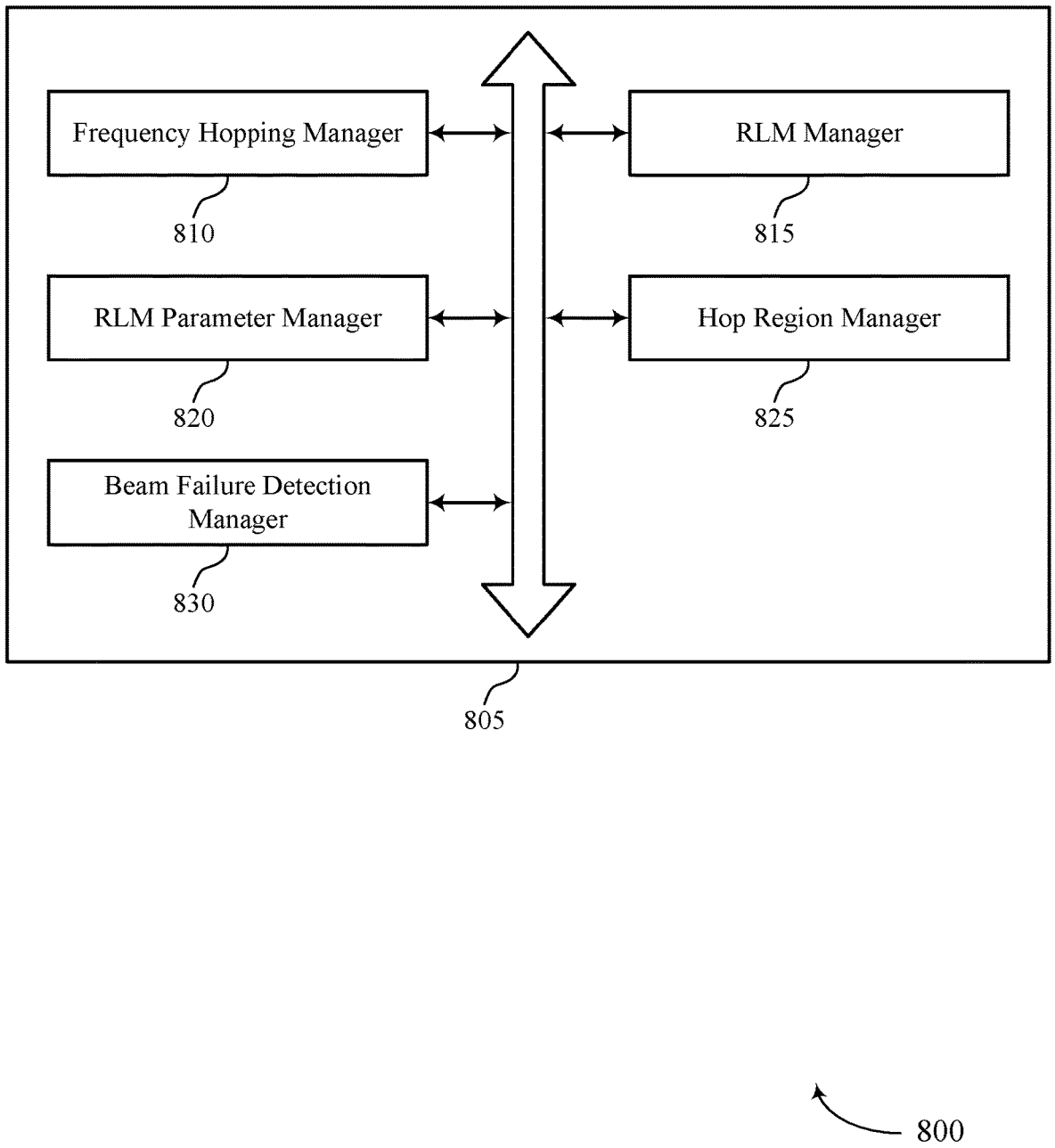
FIG. 8 shows a diagram of a communications manager that supports RLM across multiple frequencies in wireless communications in accordance with aspects of the present disclosure.

FIG. 8 shows a diagram 800 of a communications manager 805 that supports RLM across multiple frequencies in wireless communications in accordance with aspects of the present disclosure. The communications manager 805 may be an example of aspects of a communications manager 615, a communications manager 715, or a communications manager 910 described herein. The communications manager 805 may include a frequency hopping manager 810, an RLM manager 815, an RLM parameter manager 820, a hop region manager 825, and a BFD manager 830. Each of these modules may communicate, directly or indirectly, with one another (e.g., via one or more buses).

The frequency hopping manager 810 may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof.

In some examples, the frequency hopping manager 810 may receive, from the base station, an indication to skip the first BWP in the frequency hopping pattern. In some examples, the frequency hopping manager 810 may modify the frequency hopping pattern to skip the first BWP.

In some cases, a hop region is associated with the two or more frequencies that spans portions of two BWPs, and where the set of parameters associated with each hop region corresponds to the BWP having a larger frequency portion within the hop region. In some cases, the indication to skip the first BWP in the frequency hopping pattern suspends hopping to the first BWP until a subsequent indication from the base station that indicates to resume hopping to the first BWP, or for a configured period of time.

The RLM manager 815 may initiate a RLM procedure based on the set of parameters associated with each BWP. In some examples, the RLM manager 815 may monitor the two or more BWPs based on the initiating. In some examples, the RLM manager 815 may select a first BWP associated with a first hop region for monitoring for a first hop frequency of two or more frequencies that span different BWPs.

In some examples, the RLM manager 815 may identify that a majority of the first BWP overlaps with the first hop region, and may identify that the first hop region is configured to correspond to the first BWP. In some examples, the RLM manager 815 may initiate separate monitoring values for one or more parameters associated with the two or more BWPs or hop regions associated with the two or more BWPs.

In some examples, the RLM manager 815 may receive an indication from the base station that the UE is to either use the separate sets of parameters for independent monitoring of the two or more BWPs, or use a single set of parameters that is maintained across hops of the frequency hopping pattern. In some cases, the one or more parameters include one or more timers that continue running when the UE moves away from the associated BWP or hop region. In some cases, the one or more parameters include one or more timers that are paused when the UE moves away from the associated BWP or hop region and resumed when the UE moves back to the associated BWP or hop region. In some cases, the indication is received in radio resource control signaling, in a DCI transmission, in a MAC control element, or any combinations thereof.

The RLM parameter manager 820 may monitor measured parameters and determine that a configured time period since a communication using a first BWP or hop region has elapsed. In some examples, the RLM parameter manager 820 may reset the separate monitoring values associated with the first BWP or hop region.

In some cases, each set of parameters include one or more of a counter threshold value for the associated BWP, a timer threshold value for the associated BWP, one or more reference signals to be monitored for the associated BWP, or any combinations thereof. In some cases, each set of parameters includes one or more of a RLM reference signal configuration, a beam failure instance maximum count, a BFD counter, a BFR timer, or any combinations thereof. In some cases, one or more parameter thresholds associated with the two or more sets of parameters are received from the base station with the configuration information, or with an indication to activate the frequency hopping pattern.

The hop region manager 825 may identify multiple hop regions associated with a hopping pattern. In some cases, the two or more frequencies associated with the two or more successive communications each span a frequency sub-band that corresponds to a hop region, and where one or more hop regions span across one or more BWPs. In some cases, a hop region is associated with the two or more frequencies that spans portions of two BWPs, and where the monitoring is performed for the two BWPs. In some cases, one or more separate counters or timers associated with the two BWPs are used for determining radio link failure at the UE. In some cases, one or more separate counters or timers associated a BWP having a larger frequency portion within the hop region are used for determining radio link failure at the UE. In some cases, a hop region is associated with the two or more frequencies that spans portions of two BWPs, and where the configuration information further indicates which of the two BWPs is to be monitored.

The BFD manager 830 may determine that a timer associated with a first BWP of the two or more BWPs has expired on a threshold number of occasions within a time period. In some examples, the BFD manager 830 may transmit, to the base station, a request to skip the first BWP in the frequency hopping pattern. In some cases, the threshold number of occasions is indicated in the configuration information. In some cases, the timer is a BFD timer associated with the first BWP that is initiated based on channel conditions associated with the first BWP meeting beam failure criteria, and that expires prior to declaring a beam failure on the first BWP.

Figure 9:
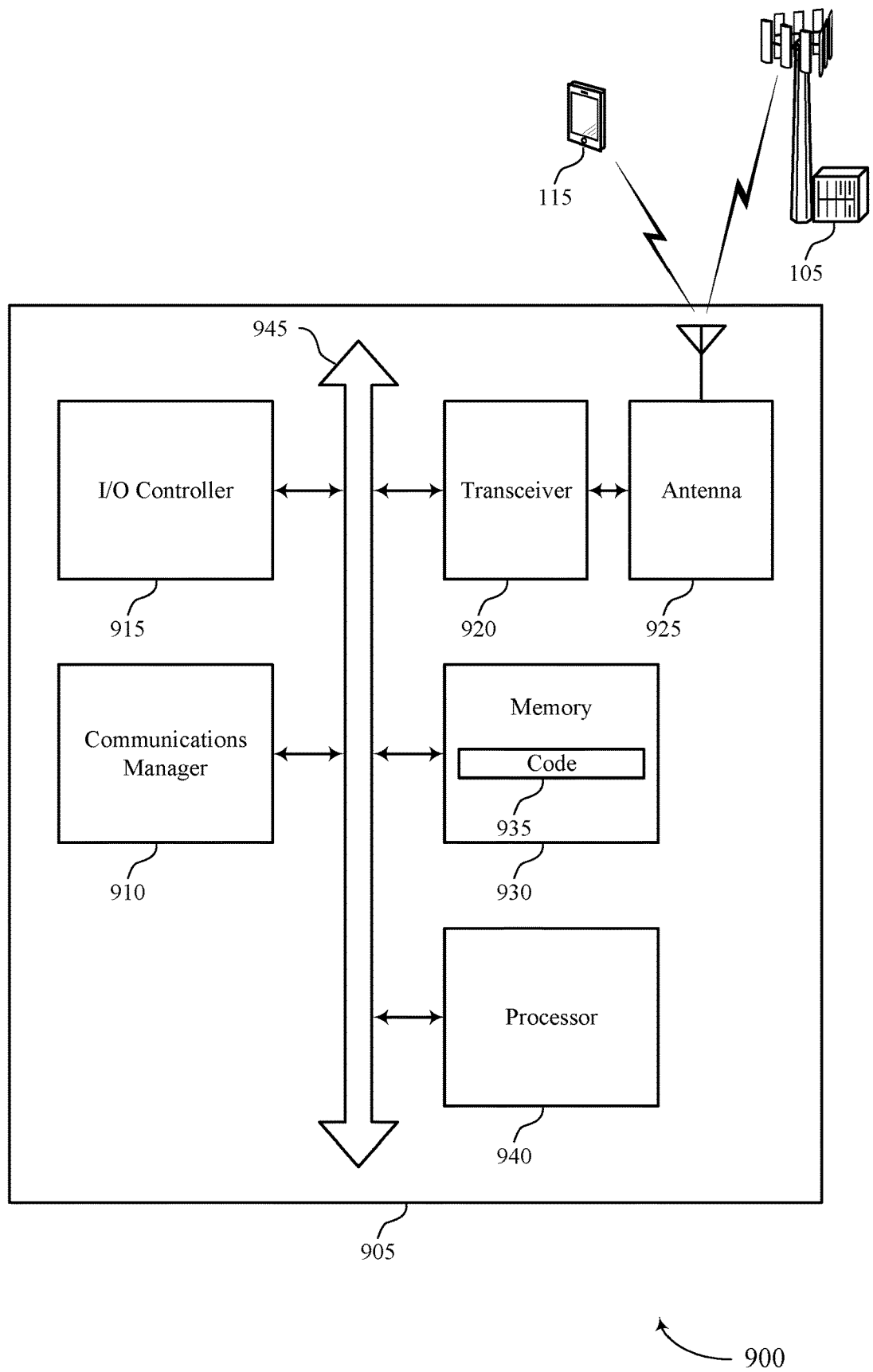
FIG. 9 shows a diagram of a system including a device that supports RLM across multiple frequencies in wireless communications in accordance with aspects of the present disclosure.

FIG. 9 shows a diagram of a system 900 including a device 905 that supports RLM across multiple frequencies in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof, initiate a RLM procedure based on the set of parameters associated with each BWP, and monitor the two or more BWPs based on the initiating.

The communications manager 910 may as described herein be implemented to realize one or more potential advantages. One implementation may allow the device 905 to perform RLM, BFD, and BFR processes separately for different configured BWPs or hop regions, which may provide an enhanced estimate for beam failures for hopping frequencies configured as part of a hopping pattern. Further, implementations may allow the device 905 to enhance reliability of communications, increase throughput, and enhance user experience, while reducing power consumption associated with retransmissions, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting RLM across multiple frequencies in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
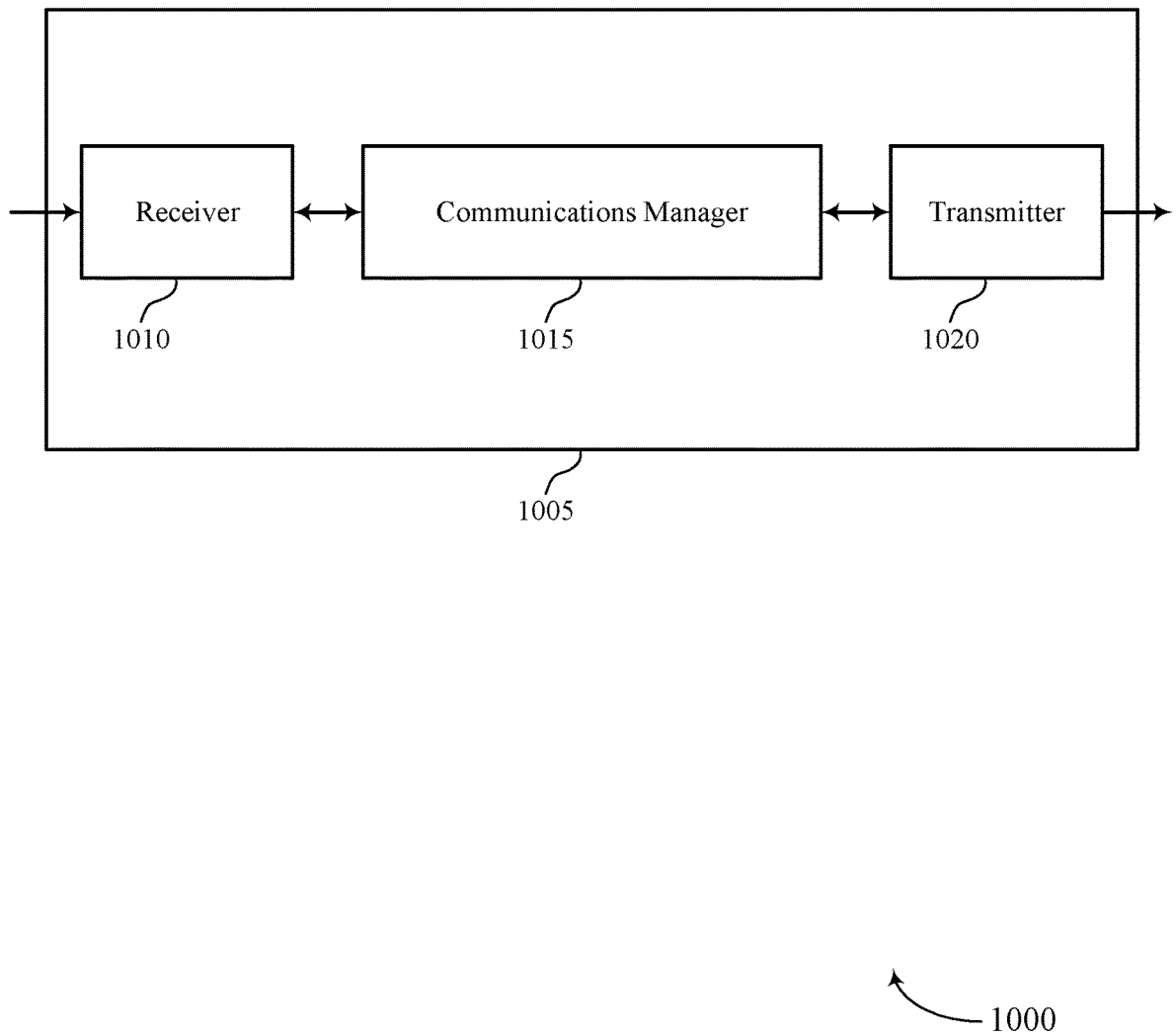
FIGS. 10 and 11 show diagrams of devices that support RLM across multiple frequencies in wireless communications in accordance with aspects of the present disclosure.

FIG. 10 shows a diagram 1000 of a device 1005 that supports RLM across multiple frequencies in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to RLM across multiple frequencies in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a connection with a UE that uses a BWP that spans a portion of a total channel bandwidth available for communications between the UE and the base station, identify a frequency hopping pattern for communications with the UE in which successive transmissions use different BWPs, communicate with the UE according to the frequency hopping pattern, and transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
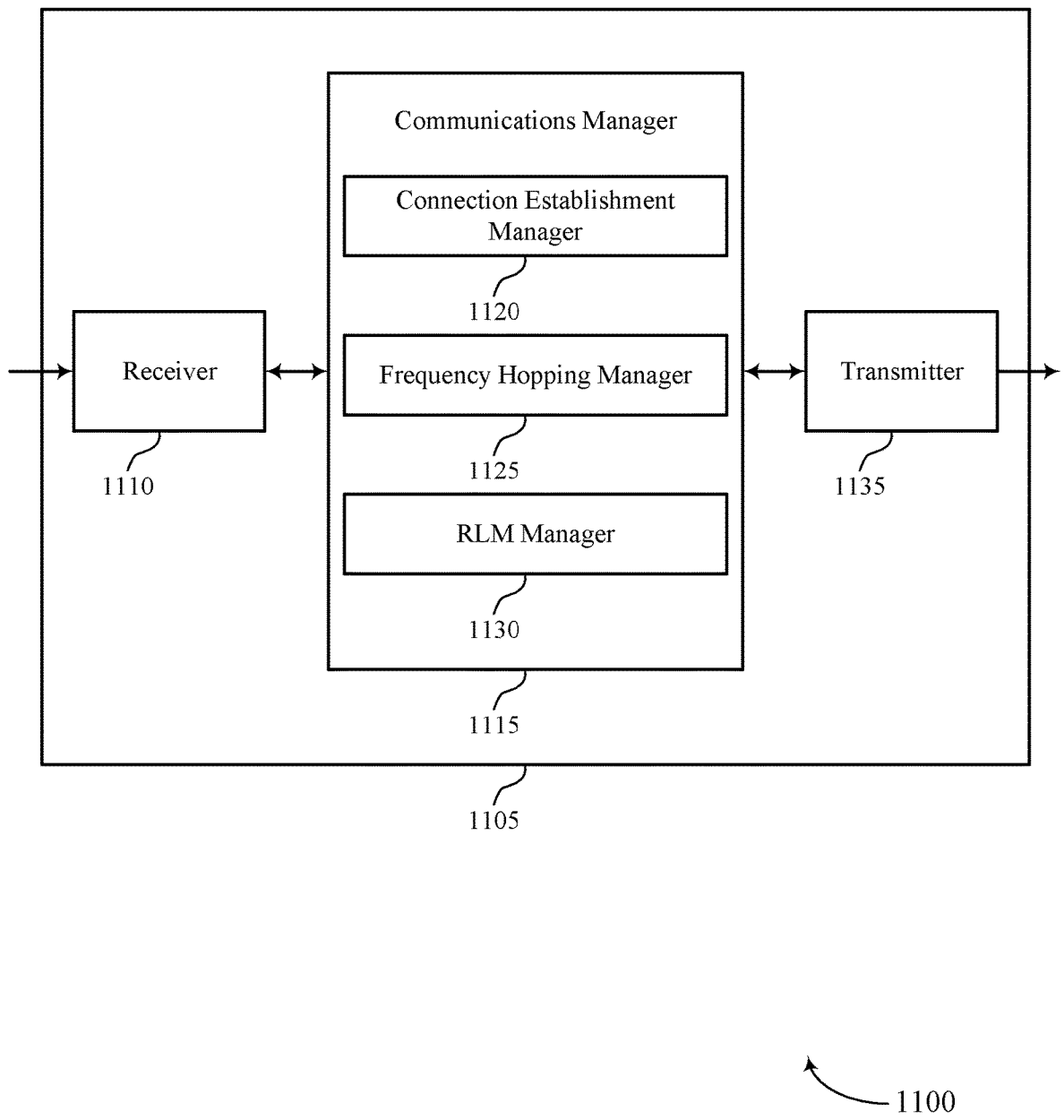

FIG. 11 shows a diagram 1100 of a device 1105 that supports RLM across multiple frequencies in wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to RLM across multiple frequencies in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a connection establishment manager 1120, a frequency hopping manager 1125, and an RLM manager 1130. The communications manager 1115 may be an example of aspects of the communications manager 1310 described herein.

The connection establishment manager 1120 may establish a connection with a UE that uses a BWP that spans a portion of a total channel bandwidth available for communications between the UE and the base station.

The frequency hopping manager 1125 may identify a frequency hopping pattern for communications with the UE in which successive transmissions use different BWPs and communicate with the UE according to the frequency hopping pattern.

The RLM manager 1130 may transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
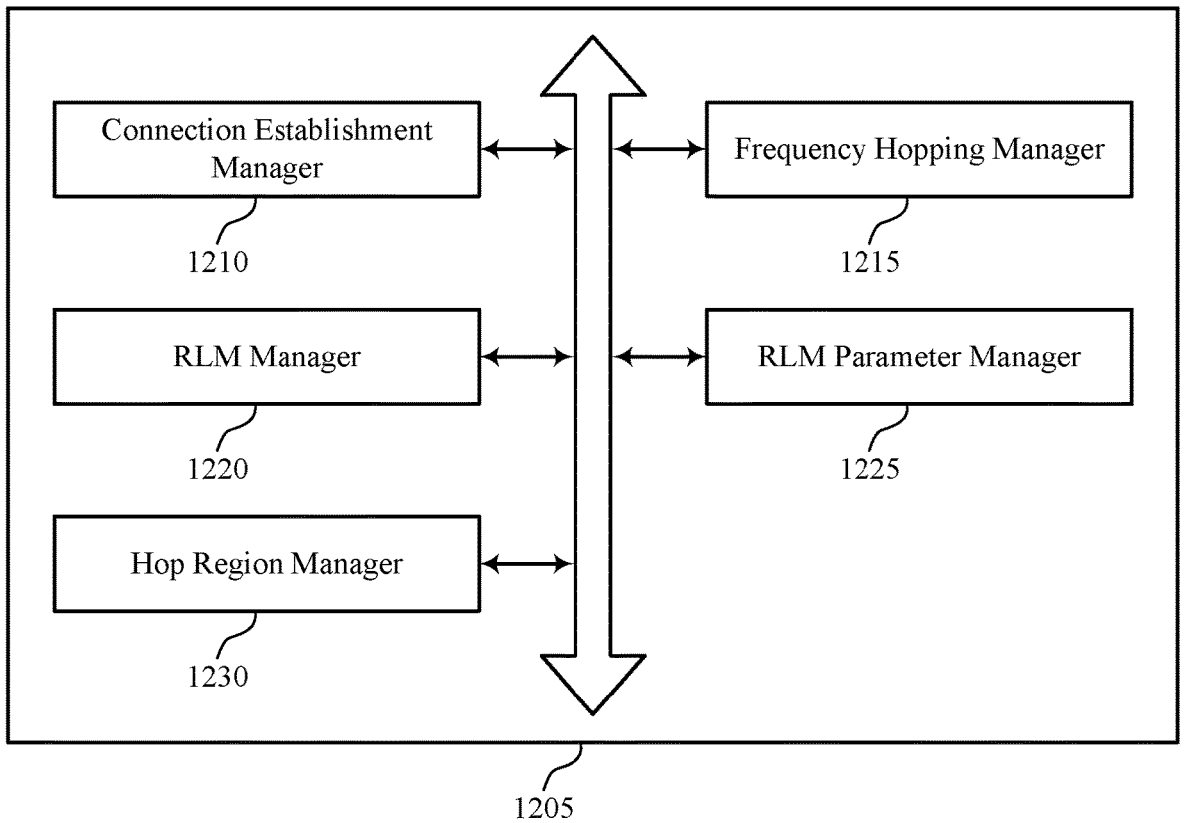
FIG. 12 shows a diagram of a communications manager that supports RLM across multiple frequencies in wireless communications in accordance with aspects of the present disclosure.

FIG. 12 shows a diagram 1200 of a communications manager 1205 that supports RLM across multiple frequencies in wireless communications in accordance with aspects of the present disclosure. The communications manager 1205 may be an example of aspects of a communications manager 1015, a communications manager 1115, or a communications manager 1310 described herein. The communications manager 1205 may include a connection establishment manager 1210, a frequency hopping manager 1215, an RLM manager 1220, an RLM parameter manager 1225, and a hop region manager 1230. Each of these modules may communicate, directly or indirectly, with one another (e.g., via one or more buses).

The connection establishment manager 1210 may establish a connection with a UE that uses a BWP that spans a portion of a total channel bandwidth available for communications between the UE and the base station.

The frequency hopping manager 1215 may identify a frequency hopping pattern for communications with the UE in which successive transmissions use different BWPs. In some examples, the frequency hopping manager 1215 may communicate with the UE according to the frequency hopping pattern.

In some examples, the frequency hopping manager 1215 may receive, from the UE, a request to skip the first BWP in the frequency hopping pattern. In some examples, the frequency hopping manager 1215 may transmit, responsive to the request, an indication to the UE to skip the first BWP in the frequency hopping pattern. In some examples, the frequency hopping manager 1215 may monitor for communications from the UE based on a modified frequency hopping pattern that skips the first BWP. In some cases, the configuration information further indicates one or more thresholds for the UE to transmit the request. In some cases, the indication to skip the first BWP in the frequency hopping pattern suspends hopping to the first BWP until a subsequent indication from the base station that indicates to resume hopping to the first BWP, or for a configured period of time.

The RLM manager 1220 may transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof.

In some examples, the RLM manager 1220 may configure the UE to maintain separate monitoring values for one or more parameters associated with the two or more BWPs or hop regions associated with the two or more BWPs. In some examples, the RLM manager 1220 may transmit an indication to the UE that indicates that the UE is to either use the separate sets of parameters for independent monitoring of the two or more BWPs, or use a single set of parameters that is maintained across hops of the frequency hopping pattern.

In some cases, the one or more parameters include one or more timers that are to continue running when the UE moves away from the associated BWP or hop region. In some cases, the one or more parameters include one or more timers that are to be paused when the UE moves away from the associated BWP or hop region and resumed when the UE moves back to the associated BWP or hop region. In some cases, the indication is transmitted in radio resource control signaling, in a DCI transmission, in a MAC-CE, or any combinations thereof.

The RLM parameter manager 1225 may configure various RLM parameters associated with a frequency hopping pattern. In some cases, each set of parameters include one or more of a counter threshold value for the associated BWP, a timer threshold value for the associated BWP, one or more reference signals to be monitored for the associated BWP, or any combinations thereof. In some cases, the configuration information further indicates a time period for resetting one or more monitoring values or timers associated with a BWP. In some cases, each set of parameters includes one or more of a RLM reference signal configuration, a beam failure instance maximum count, a BFD counter, a BFR timer, or any combinations thereof. In some cases, the configuration information further includes one or more parameter thresholds associated with the two or more sets of parameters.

The hop region manager 1230 may define two or more hop regions associated with a hopping pattern. In some cases, the two or more frequencies associated with two or more successive communications with the UE each span a frequency sub-band that corresponds to a hop region, and where one or more hop regions span across one or more BWPs. In some cases, a first BWP is associated with a first hop region that corresponds to a first hop frequency of the two or more frequencies, and where the configuration information further indicates that the UE is to monitor the first BWP that is associated with the first hop region. In some cases, a hop region is associated with the two or more frequencies that spans portions of two BWPs, and where the set of parameters associated with each hop region corresponds to the BWP having a larger frequency portion within the hop region. In some cases, a hop region is associated with the two or more frequencies that spans portions of two BWPs, and where the configuration information further indicates which of the two BWPs is to be monitored by the UE.

Figure 13:
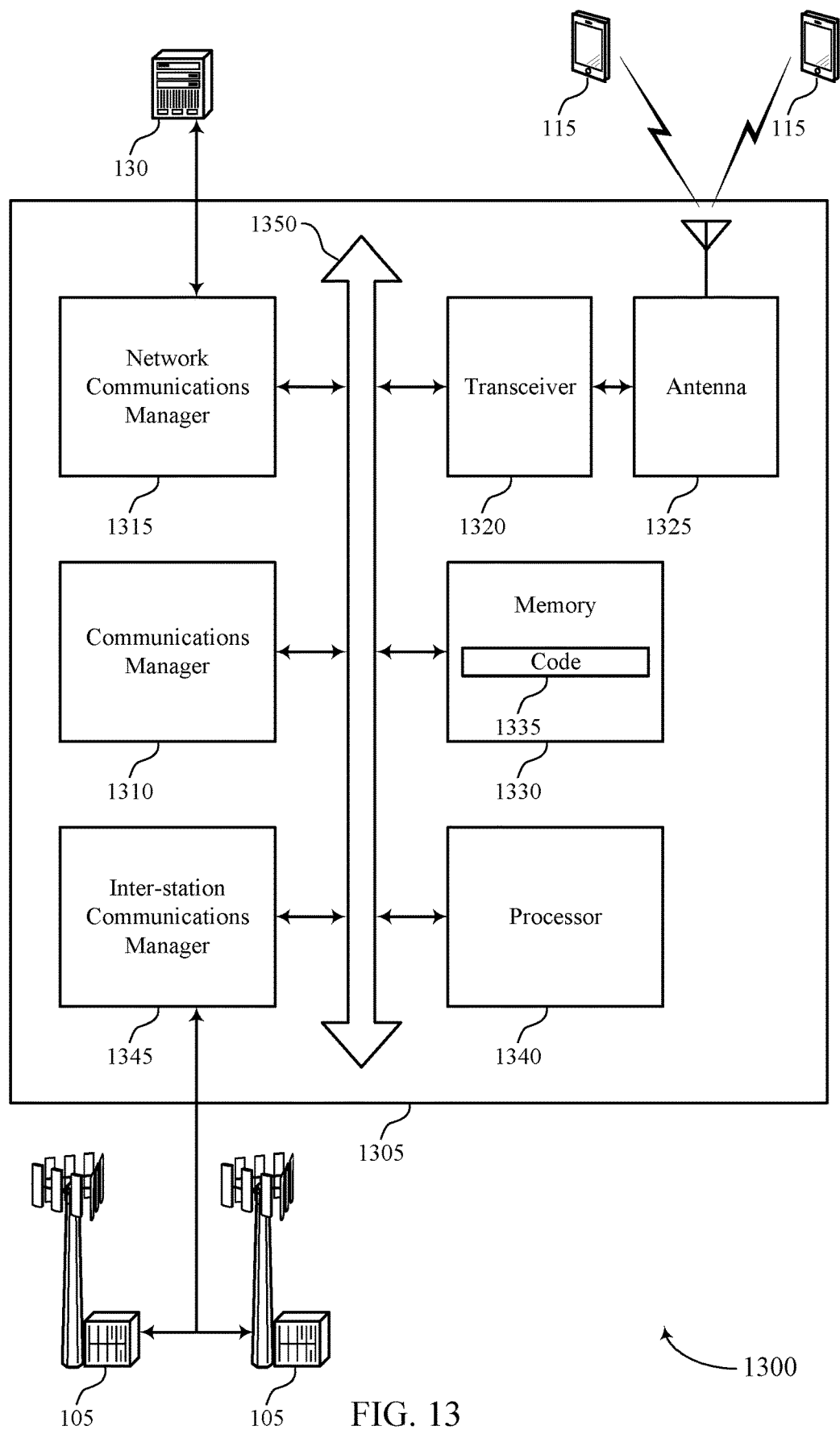
FIG. 13 shows a diagram of a system including a device that supports RLM across multiple frequencies in wireless communications in accordance with aspects of the present disclosure.

FIG. 13 shows a diagram of a system 1300 including a device 1305 that supports RLM across multiple frequencies in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish a connection with a UE that uses a BWP that spans a portion of a total channel bandwidth available for communications between the UE and the base station, identify a frequency hopping pattern for communications with the UE in which successive transmissions use different BWPs, communicate with the UE according to the frequency hopping pattern, and transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting RLM across multiple frequencies in wireless communications).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
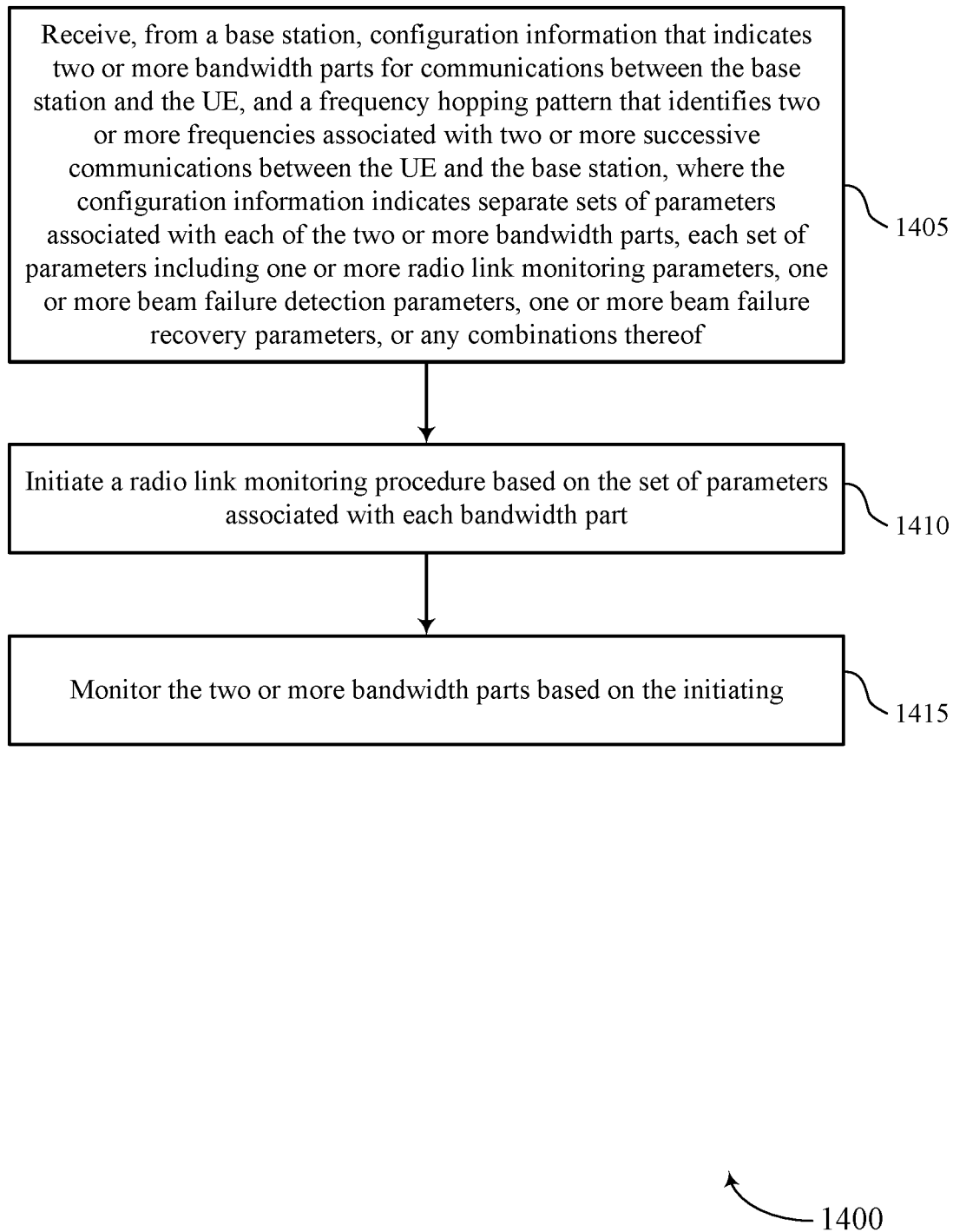
FIGS. 14 through 19 show flowcharts illustrating methods that support RLM across multiple frequencies in wireless communications in accordance with aspects of the present disclosure.

FIG. 14 shows a flowchart illustrating a method 1400 that supports RLM across multiple frequencies in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof. The operations of 1405 may be performed according to the methods described herein. In some examples, aspects of the operations of 1405 may be performed by a frequency hopping manager as described with reference to FIGS. 6 through 9.

In some cases, each set of parameters include one or more of a counter threshold value for the associated BWP, a timer threshold value for the associated BWP, one or more reference signals to be monitored for the associated BWP, or any combinations thereof. In some cases, the two or more frequencies associated with the two or more successive communications each span a frequency sub-band that corresponds to a hop region, and where one or more hop regions span across one or more BWPs. In some cases, each set of parameters includes one or more of a RLM reference signal configuration, a beam failure instance maximum count, a BFD counter, a BFR timer, or any combinations thereof. In some cases, one or more parameter thresholds associated with the two or more sets of parameters are received from the base station with the configuration information, or with an indication to activate the frequency hopping pattern.

At 1410, the UE may initiate a RLM procedure based on the set of parameters associated with each BWP. The operations of 1410 may be performed according to the methods described herein. In some examples, aspects of the operations of 1410 may be performed by an RLM manager as described with reference to FIGS. 6 through 9.

At 1415, the UE may monitor the two or more BWPs based on the initiating. The operations of 1415 may be performed according to the methods described herein. In some examples, aspects of the operations of 1415 may be performed by an RLM manager as described with reference to FIGS. 6 through 9.

Figure 15:
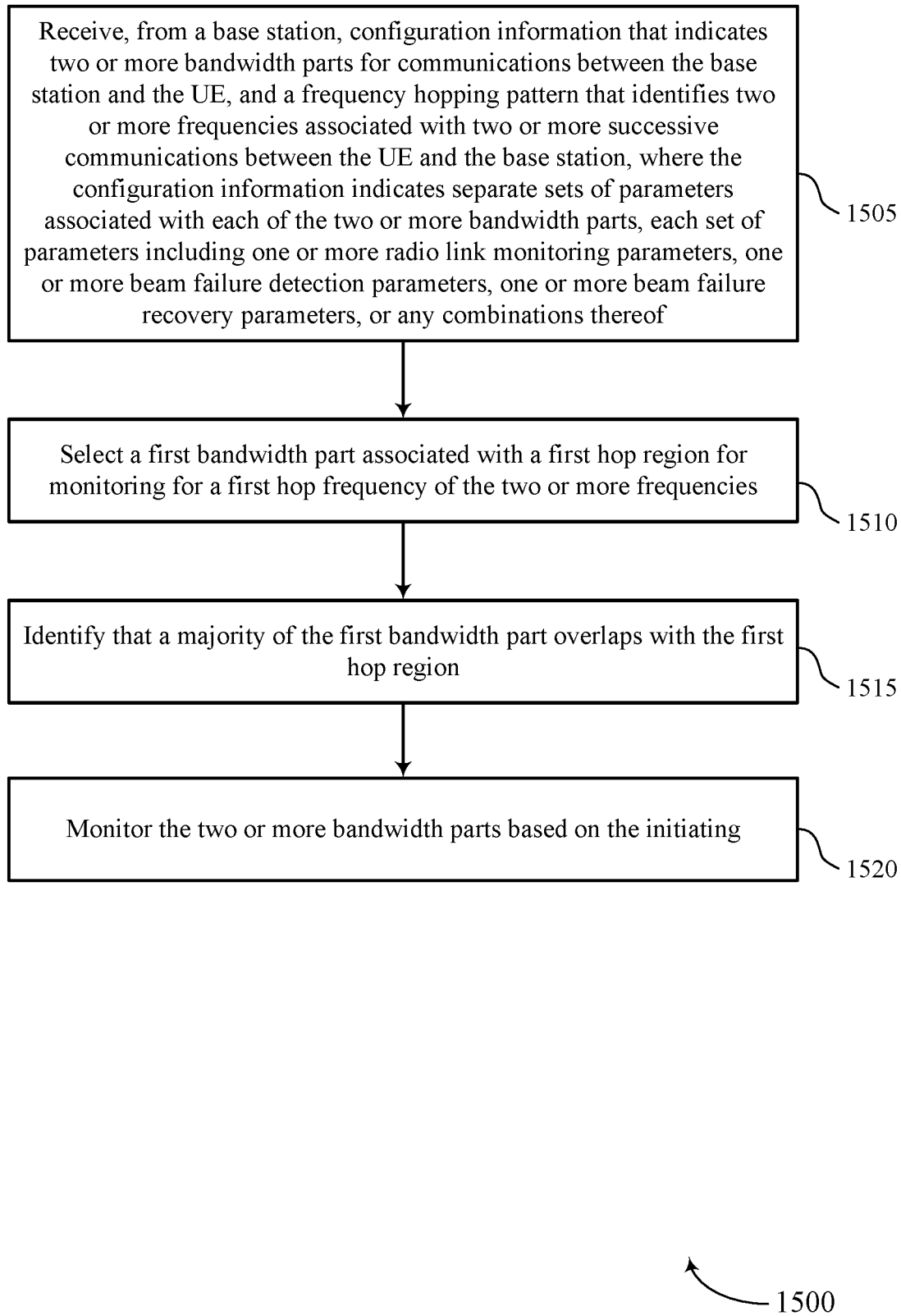

FIG. 15 shows a flowchart illustrating a method 1500 that supports RLM across multiple frequencies in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof. The operations of 1505 may be performed according to the methods described herein. In some examples, aspects of the operations of 1505 may be performed by a frequency hopping manager as described with reference to FIGS. 6 through 9. In some cases, the two or more frequencies associated with the two or more successive communications each span a frequency sub-band that corresponds to a hop region, and where one or more hop regions span across one or more BWPs.

At 1510, the UE may select a first BWP associated with a first hop region for monitoring for a first hop frequency of the two or more frequencies. The operations of 1510 may be performed according to the methods described herein. In some examples, aspects of the operations of 1510 may be performed by an RLM manager as described with reference to FIGS. 6 through 9. In some cases, the UE may select the first BWP based at least in part on identifying that a majority of the first BWP overlaps with the first hop region. In some cases, the UE may select the first BWP based at least in part on identifying that the first hop region is configured to correspond to the first BWP.

At 1515, the UE may initiate a RLM procedure based on the set of parameters associated with each BWP. The operations of 1515 may be performed according to the methods described herein. In some examples, aspects of the operations of 1515 may be performed by an RLM manager as described with reference to FIGS. 6 through 9.

At 1520, the UE may monitor the two or more BWPs based on the initiating. The operations of 1520 may be performed according to the methods described herein. In some examples, aspects of the operations of 1520 may be performed by an RLM manager as described with reference to FIGS. 6 through 9.

Figure 16:
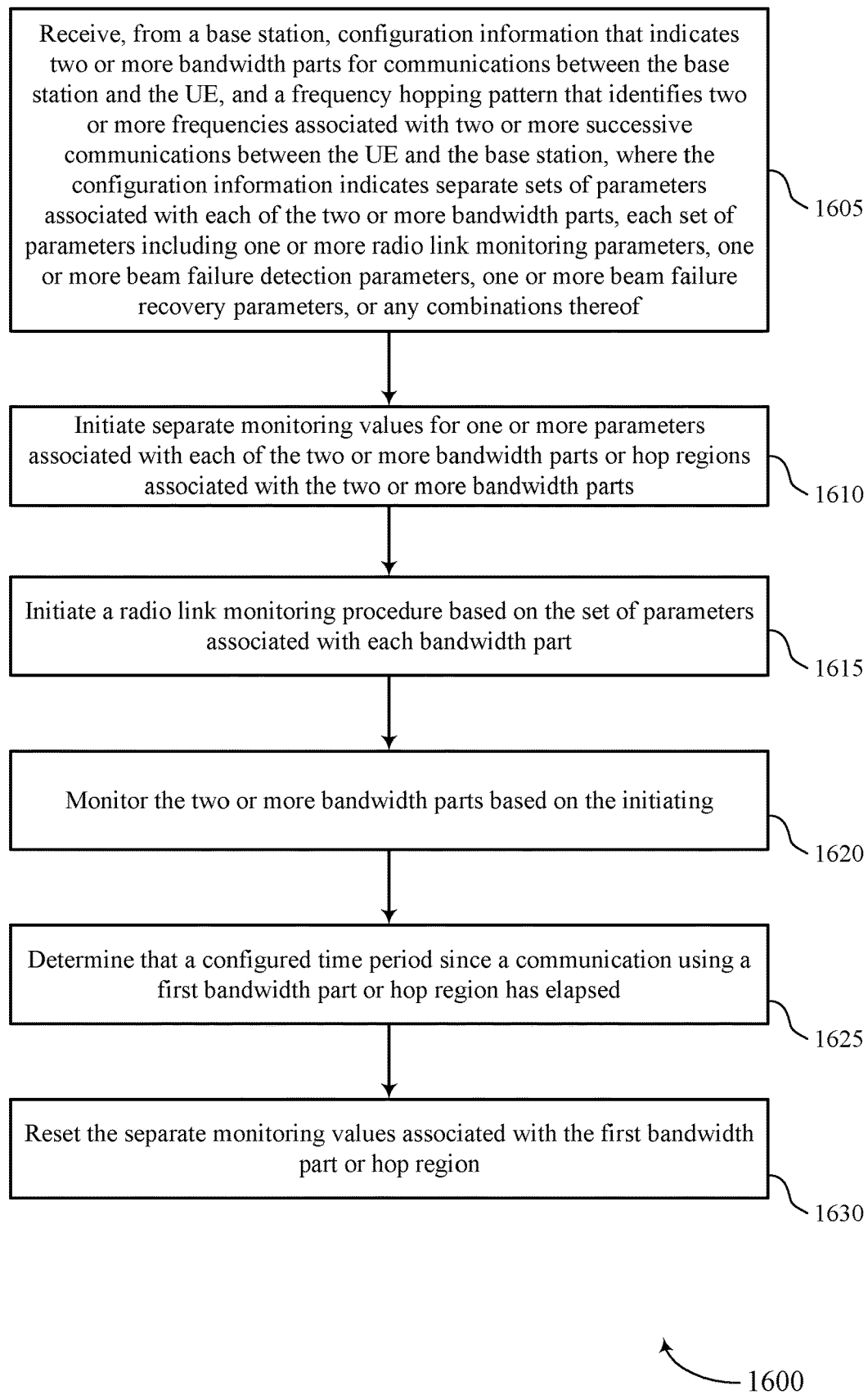

FIG. 16 shows a flowchart illustrating a method 1600 that supports RLM across multiple frequencies in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof. The operations of 1605 may be performed according to the methods described herein. In some examples, aspects of the operations of 1605 may be performed by a frequency hopping manager as described with reference to FIGS. 6 through 9.

At 1610, the UE may initiate separate monitoring values for one or more parameters associated with the two or more BWPs or hop regions associated with the two or more BWPs. The operations of 1610 may be performed according to the methods described herein. In some examples, aspects of the operations of 1610 may be performed by an RLM manager as described with reference to FIGS. 6 through 9. In some cases, the one or more parameters include one or more timers that continue running when the UE moves away from the associated BWP or hop region. In some cases, the one or more parameters include one or more timers that are paused when the UE moves away from the associated BWP or hop region and resumed when the UE moves back to the associated BWP or hop region.

At 1615, the UE may initiate a RLM procedure based on the set of parameters associated with each BWP. The operations of 1615 may be performed according to the methods described herein. In some examples, aspects of the operations of 1615 may be performed by an RLM manager as described with reference to FIGS. 6 through 9.

At 1620, the UE may monitor the two or more BWPs based on the initiating. The operations of 1620 may be performed according to the methods described herein. In some examples, aspects of the operations of 1620 may be performed by an RLM manager as described with reference to FIGS. 6 through 9.

At 1625, the UE may determine that a configured time period since a communication using a first BWP or hop region has elapsed. The operations of 1625 may be performed according to the methods described herein. In some examples, aspects of the operations of 1625 may be performed by an RLM parameter manager as described with reference to FIGS. 6 through 9.

At 1630, the UE may reset the separate monitoring values associated with the first BWP or hop region. The operations of 1630 may be performed according to the methods described herein. In some examples, aspects of the operations of 1630 may be performed by an RLM parameter manager as described with reference to FIGS. 6 through 9.

Figure 17:
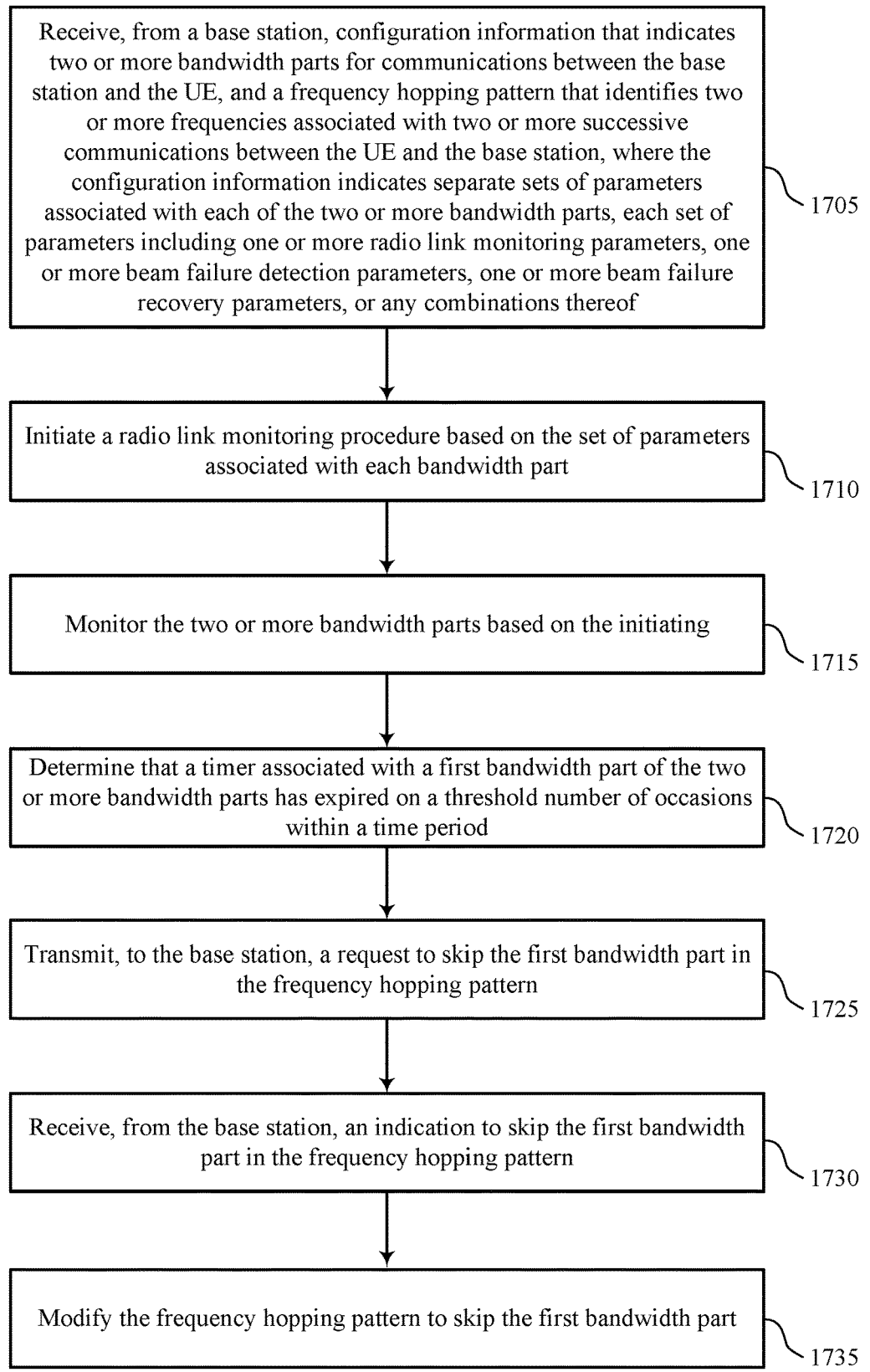

FIG. 17 shows a flowchart illustrating a method 1700 that supports RLM across multiple frequencies in wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, configuration information that indicates two or more BWPs for communications between the base station and the UE, and a frequency hopping pattern that identifies two or more frequencies associated with two or more successive communications between the UE and the base station, where the configuration information indicates separate sets of parameters associated with the two or more BWPs, each set of parameters including one or more RLM parameters, one or more BFD parameters, one or more BFR parameters, or any combinations thereof. The operations of 1705 may be performed according to the methods described herein. In some examples, aspects of the operations of 1705 may be performed by a frequency hopping manager as described with reference to FIGS. 6 through 9.

At 1710, the UE may initiate a RLM procedure based on the set of parameters associated with each BWP. The operations of 1710 may be performed according to the methods described herein. In some examples, aspects of the operations of 1710 may be performed by an RLM manager as described with reference to FIGS. 6 through 9.

At 1715, the UE may monitor the two or more BWPs based on the initiating. The operations of 1715 may be performed according to the methods described herein. In some examples, aspects of the operations of 1715 may be performed by an RLM manager as described with reference to FIGS. 6 through 9.

At 1720, the UE may determine that a timer associated with a first BWP of the two or more BWPs has expired on a threshold number of occasions within a time period. The operations of 1720 may be performed according to the methods described herein. In some examples, aspects of the operations of 1720 may be performed by a BFD manager as described with reference to FIGS. 6 through 9. In some cases, the threshold number of occasions is indicated in the configuration information. In some cases, the timer is a BFD timer associated with the first BWP that is initiated based on channel conditions associated with the first BWP meeting beam failure criteria, and that expires prior to declaring a beam failure on the first BWP.

At 1725, the UE may transmit, to the base station, a request to skip the first BWP in the frequency hopping pattern. The operations of 1725 may be performed according to the methods described herein. In some examples, aspects of the operations of 1725 may be performed by a BFD manager as described with reference to FIGS. 6 through 9.

At 1730, the UE may receive, from the base station, an indication to skip the first BWP in the frequency hopping pattern. The operations of 1730 may be performed according to the methods described herein. In some examples, aspects of the operations of 1730 may be performed by a frequency hopping manager as described with reference to FIGS. 6 through 9. In some cases, the indication to skip the first BWP in the frequency hopping pattern suspends hopping to the first BWP until a subsequent indication from the base station that indicates to resume hopping to the first BWP, or for a configured period of time.

At 1735, the UE may modify the frequency hopping pattern to skip the first BWP. The operations of 1735 may be performed according to the methods described herein. In some examples, aspects of the operations of 1735 may be performed by a frequency hopping manager as described with reference to FIGS. 6 through 9.

Figure 18:
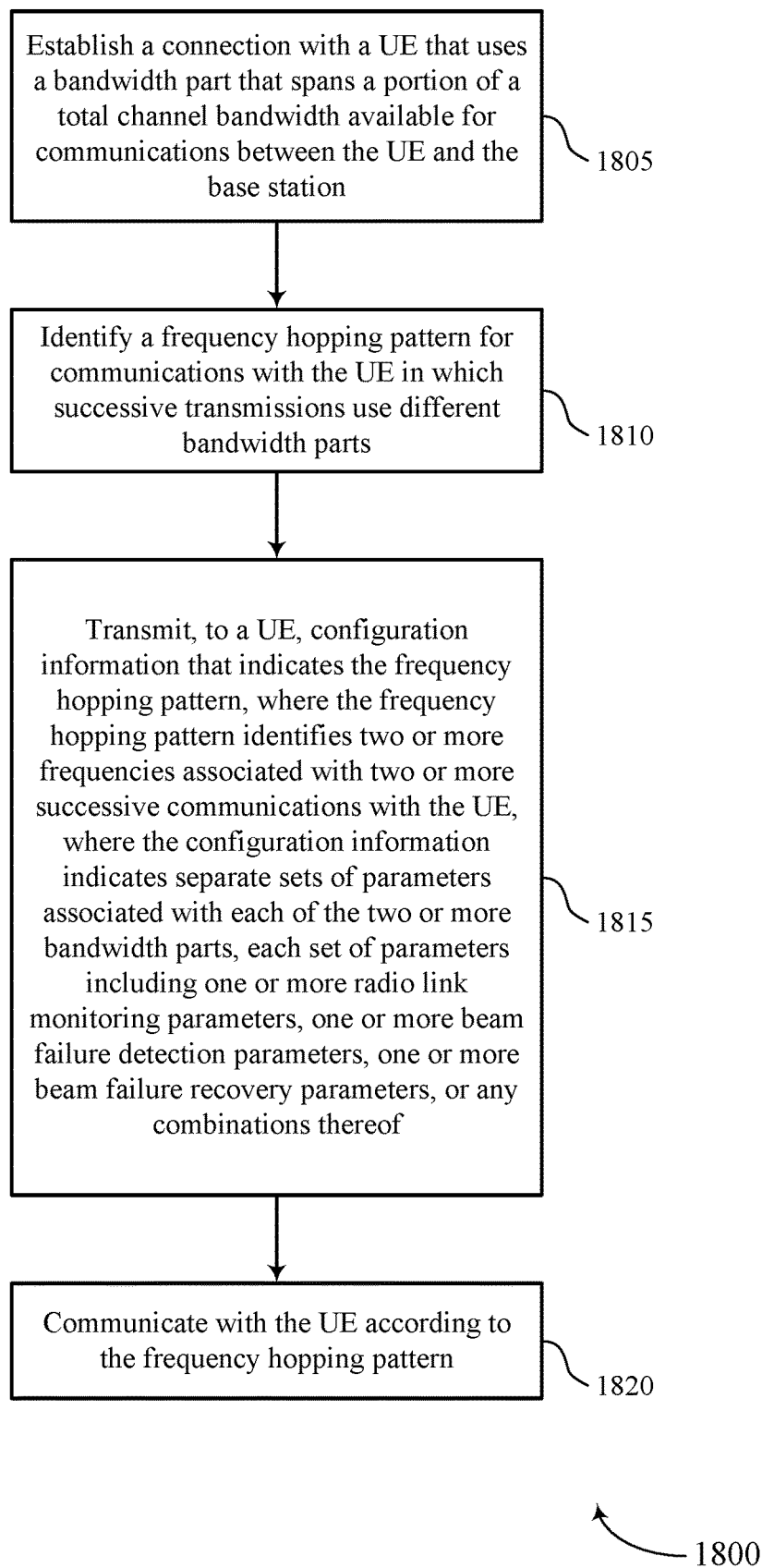

FIG. 18 shows a flowchart illustrating a method 1800 that supports RLM across multiple frequencies in wireless communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may establish a connection with a UE that uses a BWP that spans a portion of a total channel bandwidth available for communications between the UE and the base station. The operations of 1805 may be performed according to the methods described herein. In some examples, aspects of the operations of 1805 may be performed by a connection establishment manager as described with reference to FIGS. 10 through 13.

At 1810, the base station may identify a frequency hopping pattern for communications with the UE in which successive transmissions use different BWPs. The operations of 1810 may be performed according to the methods described herein. In some examples, aspects of the operations of 1810 may be performed by a frequency hopping manager as described with reference to FIGS. 10 through 13.

At 1815, the base station may transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof. The operations of 1815 may be performed according to the methods described herein. In some examples, aspects of the operations of 1815 may be performed by an RLM manager as described with reference to FIGS. 10 through 13.

At 1820, the base station may communicate with the UE according to the frequency hopping pattern. The operations of 1820 may be performed according to the methods described herein. In some examples, aspects of the operations of 1820 may be performed by a frequency hopping manager as described with reference to FIGS. 10 through 13.

Figure 19:
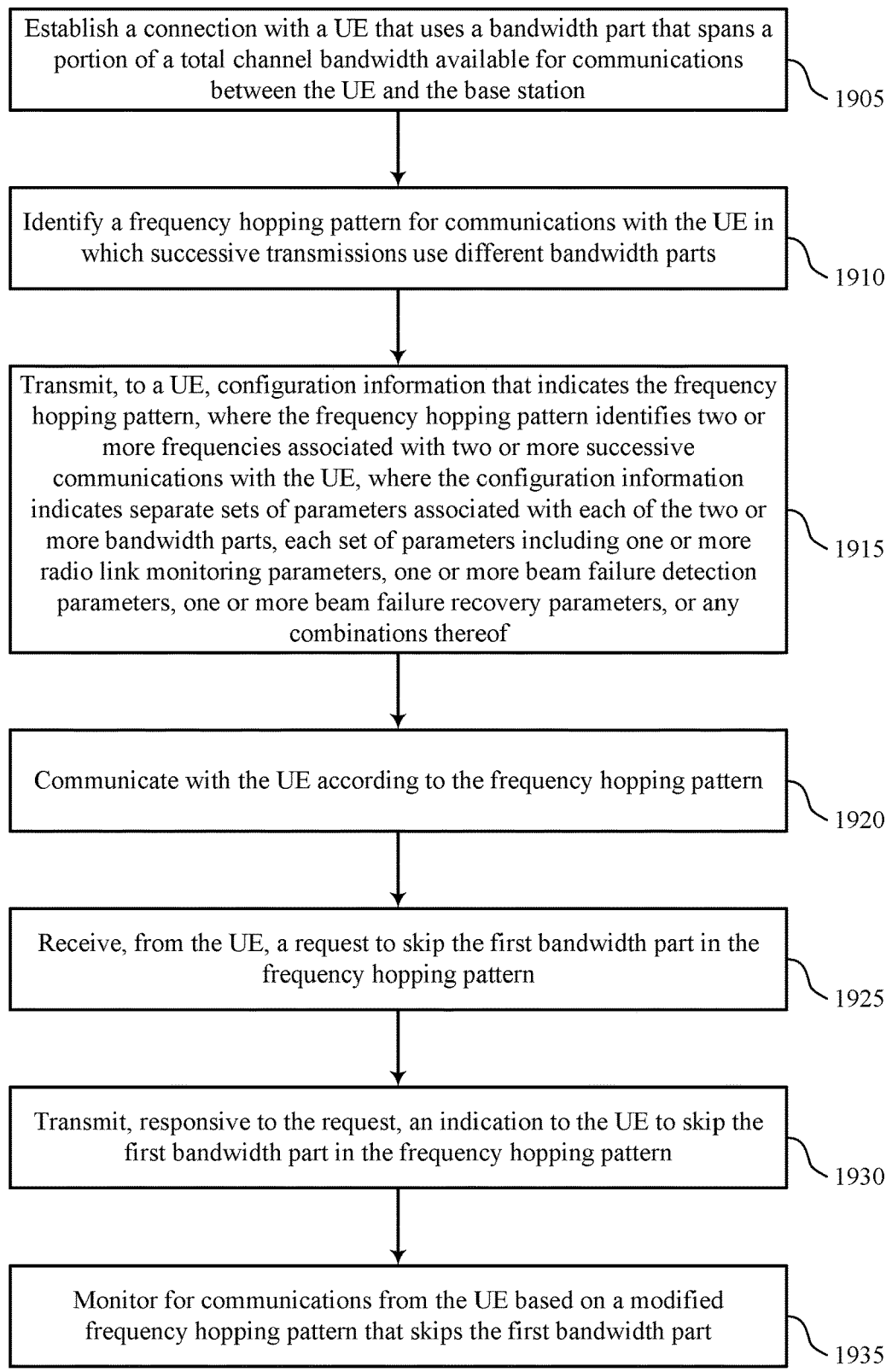

FIG. 19 shows a flowchart illustrating a method 1900 that supports RLM across multiple frequencies in wireless communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may establish a connection with a UE that uses a BWP that spans a portion of a total channel bandwidth available for communications between the UE and the base station. The operations of 1905 may be performed according to the methods described herein. In some examples, aspects of the operations of 1905 may be performed by a connection establishment manager as described with reference to FIGS. 10 through 13.

At 1910, the base station may identify a frequency hopping pattern for communications with the UE in which successive transmissions use different BWPs. The operations of 1910 may be performed according to the methods described herein. In some examples, aspects of the operations of 1910 may be performed by a frequency hopping manager as described with reference to FIGS. 10 through 13.

At 1915, the base station may transmit, to a UE, configuration information that indicates the frequency hopping pattern, where the frequency hopping pattern identifies two or more frequencies associated with two or more successive communications with the UE, where the configuration information indicates separate sets of parameters associated with the two or more BWPs, each set of parameters including one or more RLM parameters, one or more BFD parameters, one or more BFR parameters, or any combinations thereof. The operations of 1915 may be performed according to the methods described herein. In some examples, aspects of the operations of 1915 may be performed by an RLM manager as described with reference to FIGS. 10 through 13.

At 1920, the base station may communicate with the UE according to the frequency hopping pattern. The operations of 1920 may be performed according to the methods described herein. In some examples, aspects of the operations of 1920 may be performed by a frequency hopping manager as described with reference to FIGS. 10 through 13.

At 1925, the base station may receive, from the UE, a request to skip the first BWP in the frequency hopping pattern. The operations of 1925 may be performed according to the methods described herein. In some examples, aspects of the operations of 1925 may be performed by a frequency hopping manager as described with reference to FIGS. 10 through 13.

At 1930, the base station may transmit, responsive to the request, an indication to the UE to skip the first BWP in the frequency hopping pattern. The operations of 1930 may be performed according to the methods described herein. In some examples, aspects of the operations of 1930 may be performed by a frequency hopping manager as described with reference to FIGS. 10 through 13.

At 1935, the base station may monitor for communications from the UE based on a modified frequency hopping pattern that skips the first BWP. The operations of 1935 may be performed according to the methods described herein. In some examples, aspects of the operations of 1935 may be performed by a frequency hopping manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, configuration information that indicates two or more BWPs for communications between the base station and the UE, and a frequency hopping pattern that identifies two or more frequencies associated with two or more successive communications between the UE and the base station, wherein the configuration information indicates separate sets of parameters for the two or more BWPs, each set of parameters including one or more RLM parameters, one or more BFD parameters, one or more BFR parameters, or any combinations thereof; initiating a RLM procedure based at least in part on the set of parameters for each BWP; and monitoring the two or more BWPs based at least in part on the initiating.

Aspect 2: The method of aspect 1, wherein each set of parameters include one or more of a counter threshold value for the associated BWP, a timer threshold value for the associated BWP, one or more reference signals to be monitored for the associated BWP, or any combinations thereof.

Aspect 3: The method of any of aspects 1 through 2, wherein the two or more frequencies associated with the two or more successive communications each span a frequency sub-band that corresponds to a hop region, and one or more hop regions span across one or more BWPs.

Aspect 4: The method of aspect 3, further comprising: selecting a first BWP associated with a first hop region for monitoring for a first hop frequency of the two or more frequencies.

Aspect 5: The method of aspect 4, wherein the selecting further comprises: identifying that a majority of the first BWP overlaps with the first hop region.

Aspect 6: The method of any of aspects 4 through 5, wherein the selecting further comprises: identifying that the first hop region is configured to correspond to the first BWP.

Aspect 7: The method of any of aspects 1 through 6, further comprising: initiating separate monitoring values for one or more parameters associated with the two or more BWPs or hop regions associated with the two or more BWPs.

Aspect 8: The method of aspect 7, wherein the one or more parameters include one or more timers that continue running when the UE moves away from the associated BWP or hop region.

Aspect 9: The method of any of aspects 7 through 8, wherein the one or more parameters include one or more timers that are paused when the UE moves away from the associated BWP or hop region and resumed when the UE moves back to the associated BWP or hop region.

Aspect 10: The method of any of aspects 7 through 9, further comprising: determining that a configured time period since a communication using a first BWP or hop region has elapsed; and resetting the separate monitoring values associated with the first BWP or hop region.

Aspect 11: The method of any of aspects 1 through 10, wherein each set of parameters includes one or more of a RLM reference signal configuration, a beam failure instance maximum count, a BFD counter, a BFR timer, or any combinations thereof.

Aspect 12: The method of any of aspects 1 through 11, wherein one or more parameter thresholds associated with each set of parameters are received from the base station with the configuration information, or with an indication to activate the frequency hopping pattern.

Aspect 13: The method of any of aspects 1 through 12, further comprising: receiving an indication from the base station that the UE is to either use the separate sets of parameters for independent monitoring of the two or more BWPs, or use a single set of parameters that is maintained across hops of the frequency hopping pattern.

Aspect 14: The method of aspect 13, wherein the indication is received in radio resource control signaling, in a DCI transmission, in a MAC-CE, or any combinations thereof.

Aspect 15: The method of any of aspects 1 through 14, wherein a hop region is associated with each of the two or more frequencies that spans portions of two BWPs, and the set of parameters associated with each hop region corresponds to the BWP having a larger frequency portion within the hop region.

Aspect 16: The method of any of aspects 1 through 15, wherein a hop region is associated with the two or more frequencies that spans portions of two BWPs, and the monitoring is performed for the two BWPs.

Aspect 17: The method of aspect 16, wherein one or more separate counters or timers associated with the two BWPs are used for determining RLF at the UE.

Aspect 18: The method of any of aspects 16 through 17, wherein one or more separate counters or timers associated with a BWP having a larger frequency portion within the hop region are used for determining RLF at the UE.

Aspect 19: The method of any of aspects 1 through 18, wherein a hop region is associated with the two or more frequencies that spans portions of two BWPs, and the configuration information further indicates which of the two BWPs is to be monitored.

Aspect 20: The method of any of aspects 1 through 19, further comprising: determining that a timer associated with a first BWP of the two or more BWPs has expired on a threshold number of occasions within a time period; and transmitting, to the base station, a request to skip the first BWP in the frequency hopping pattern.

Aspect 21: The method of aspect 20, wherein the threshold number of occasions is indicated in the configuration information.

Aspect 22: The method of any of aspects 20 through 21, wherein the timer is a BFD timer associated with the first BWP that is initiated based on channel conditions associated with the first BWP meeting beam failure criteria, and that expires prior to declaring a beam failure on the first BWP.

Aspect 23: The method of any of aspects 20 through 22, further comprising: receiving, from the base station, an indication to skip the first BWP in the frequency hopping pattern; and modifying the frequency hopping pattern to skip the first BWP.

Aspect 24: The method of aspect 23, wherein the indication to skip the first BWP in the frequency hopping pattern suspends hopping to the first BWP until a subsequent indication from the base station that indicates to resume hopping to the first BWP, or for a configured period of time.

Aspect 25: An apparatus for wireless communication at a UE, comprising a processor; memory coupled with the processor; and instructions stored in the memory and executable by the processor to cause the apparatus to perform a method of any of aspects 1 through 24.

Aspect 26: An apparatus for wireless communication at a UE, comprising at least one means for performing a method of any of aspects 1 through 24.

Aspect 27: A non-transitory computer-readable medium storing code for wireless communication at a UE, the code comprising instructions executable by a processor to perform a method of any of aspects 1 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving configuration information that indicates two or more bandwidth parts for communications between a network entity and the UE, two or more sets of parameters for the two or more bandwidth parts, and a frequency hopping pattern associated with two or more successive communications between the UE and the network entity;
monitoring the two or more bandwidth parts in accordance with the two or more sets of parameters indicated by the configuration information; and
performing the two or more successive communications in two or more hop regions according to the frequency hopping pattern, wherein the two or more hop regions overlap at least partially with the two or more bandwidth parts.

2. The method of claim 1, wherein the two or more sets of parameters include one or more of a counter threshold value for an associated bandwidth part, a timer threshold value for the associated bandwidth part, a reference signal to be monitored for the associated bandwidth part, a radio link monitoring parameter for the associated bandwidth part, a beam failure detection parameter for the associated bandwidth part, or a beam failure recovery parameter for the associated bandwidth part.

3. The method of claim 1, wherein:
two or more frequencies used for the two or more successive communications span a frequency sub-band that corresponds to a hop region of the two or more hop regions; and
one or more hop regions of the two or more hop regions span across one or more bandwidth parts of the two or more bandwidth parts.

4. The method of claim 3, further comprising:
selecting a first bandwidth part associated with a first hop region for monitoring a first hop frequency of the two or more frequencies.

5. The method of claim 4, further comprising:
identifying that a majority of the first bandwidth part overlaps with the first hop region.

6. The method of claim 4, further comprising:
identifying that the first hop region corresponds to the first bandwidth part.

7. The method of claim 1, further comprising:
determining to use separate monitoring values for one or more parameters associated with the two or more bandwidth parts or the two or more hop regions associated with the two or more bandwidth parts.

8. The method of claim 7, wherein the one or more parameters include one or more timers that continue running when the UE moves away from an associated bandwidth part or hop region.

9. The method of claim 7, wherein:
the one or more parameters include one or more timers that are paused when the UE moves away from an associated bandwidth part or hop region; and
the one or more timers are resumed when the UE moves back to the associated bandwidth part or hop region.

10. The method of claim 7, further comprising:
determining that a configured time period since a communication using a first bandwidth part or hop region has elapsed; and
resetting the separate monitoring values associated with the first bandwidth part or hop region.

11. The method of claim 1, wherein the two or more sets of parameters include one or more of a radio link monitoring reference signal configuration, a beam failure instance maximum count, a beam failure detection counter, or a beam failure recovery timer.

12. The method of claim 1, wherein one or more parameter thresholds associated with the two or more sets of parameters are received with the configuration information or an indication to activate the frequency hopping pattern.

13. The method of claim 1, further comprising:
receiving an indication that the UE is to either use separate sets of parameters for independent monitoring of the two or more bandwidth parts or a single set of parameters maintained across hops of the frequency hopping pattern.

14. The method of claim 13, wherein the indication is received via radio resource control signaling, a downlink control information (DCI) transmission, a medium access control (MAC) control element, or any combination thereof.

15. The method of claim 1, wherein:
a hop region of the two or more hop regions spans portions of two bandwidth parts; and
a set of parameters associated with the hop region corresponds to a bandwidth part having a larger frequency portion within the hop region.

16. The method of claim 1, wherein:
a hop region of the two or more hop regions spans portions of two bandwidth parts; and
the UE monitors the two bandwidth parts using a set of parameters configured for the hop region.

17. The method of claim 16, wherein one or more separate counters or timers associated with the two bandwidth parts are used for radio link failure processes at the UE.

18. The method of claim 16, wherein one or more separate counters or timers associated with a bandwidth part having a larger frequency portion within the hop region are used for radio link failure processes at the UE.

19. The method of claim 1, wherein:
a hop region of the two or more hop regions spans portions of two bandwidth parts; and
the configuration information further indicates which of the two bandwidth parts is to be monitored for the hop region.

20. The method of claim 1, further comprising:
determining that a timer associated with a first bandwidth part of the two or more bandwidth parts has expired on a threshold number of occasions within a time period; and
transmitting a request to skip the first bandwidth part in the frequency hopping pattern.

21. The method of claim 20, wherein the threshold number of occasions is indicated by the configuration information.

22. The method of claim 20, wherein:
the timer is a beam failure detection timer associated with the first bandwidth part that is initiated based on channel conditions associated with the first bandwidth part satisfying beam failure criteria; and the timer expires prior to declaring a beam failure on the first bandwidth part.

23. The method of claim 20, further comprising:
receiving an indication to skip the first bandwidth part in the frequency hopping pattern; and
modifying the frequency hopping pattern to skip the first bandwidth part.

24. The method of claim 23, wherein the indication to skip the first bandwidth part in the frequency hopping pattern suspends hopping to the first bandwidth part for a configured period of time or until a subsequent indication indicates to resume hopping to the first bandwidth part.

25. An apparatus for wireless communication at a user equipment (UE), comprising:
a processor;
a memory coupled with the processor; and
instructions stored in the memory and executable by the processor to cause the apparatus to:
receive configuration information that indicates two or more bandwidth parts for communications between a network entity and the UE, two or more sets of parameters for the two or more bandwidth parts, and a frequency hopping pattern associated with two or more successive communications between the UE and the network entity;
monitor the two or more bandwidth parts in accordance with the two or more sets of parameters indicated by the configuration information; and
perform the two or more successive communications in two or more hop regions according to the frequency hopping pattern, wherein the two or more hop regions overlap at least partially with the two or more bandwidth parts.

26. The apparatus of claim 25, wherein the two or more sets of parameters include one or more of a counter threshold value for an associated bandwidth part, a timer threshold value for the associated bandwidth part, a reference signal to be monitored for the associated bandwidth part, a radio link monitoring parameter for the associated bandwidth part, a beam failure detection parameter for the associated bandwidth part, or a beam failure recovery parameter for the associated bandwidth part.

27. The apparatus of claim 25, wherein:
two or more frequencies used for the two or more successive communications span a frequency sub-band that corresponds to a hop region of the two or more hop regions; and
one or more hop regions of the two or more hop regions span across one or more bandwidth parts of the two or more bandwidth parts.

28. The apparatus of claim 27, wherein the instructions are further executable by the processor to cause the apparatus to:
select a first bandwidth part associated with a first hop region for monitoring a first hop frequency of the two or more frequencies.

29. An apparatus for wireless communication at a user equipment (UE), comprising:
means for receiving configuration information that indicates two or more bandwidth parts for communications between a network entity and the UE, two or more sets of parameters for the two or more bandwidth parts, and a frequency hopping pattern associated with two or more successive communications between the UE and the network entity;
means for monitoring the two or more bandwidth parts in accordance with the two or more sets of parameters indicated by the configuration information; and
means for performing the two or more successive communications in two or more hop regions according to the frequency hopping pattern, wherein the two or more hop regions overlap at least partially with the two or more bandwidth parts.

30. A non-transitory computer-readable medium storing code for wireless communication at a user equipment (UE), the code comprising instructions executable by a processor to:
receive configuration information that indicates two or more bandwidth parts for communications between a network entity and the UE, two or more sets of parameters for the two or more bandwidth parts, and a frequency hopping pattern associated with two or more successive communications between the UE and the network entity;
monitor the two or more bandwidth parts in accordance with the two or more sets of parameters indicated by the configuration information; and
perform the two or more successive communications in two or more hop regions according to the frequency hopping pattern, wherein the two or more hop regions overlap at least partially with the two or more bandwidth parts.

* * * * *